(12) United States Patent
Manolakos et al.

(10) Patent No.: US 11,438,862 B2
(45) Date of Patent: Sep. 6, 2022

(54) METHODS AND APPARATUS FOR USING INTERLACED PHYSICAL RESOURCE BLOCKS FOR POSITIONING MEASUREMENTS

(71) Applicant: QUALCOMM Incorporated, San Diego, CA (US)

(72) Inventors: Alexandros Manolakos, Escondido, CA (US); Weimin Duan, San Diego, CA (US); Gokul Sridharan, Sunnyvale, CA (US); Jay Kumar Sundararajan, San Diego, CA (US); Hwan Joon Kwon, San Diego, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/307,796

(22) Filed: May 4, 2021

(65) Prior Publication Data

US 2021/0360572 A1 Nov. 18, 2021

Related U.S. Application Data

(60) Provisional application No. 63/025,076, filed on May 14, 2020.

(51) Int. Cl.
*H04W 64/00* (2009.01)
*H04L 5/00* (2006.01)
(Continued)

(52) U.S. Cl.
CPC .......... *H04W 64/00* (2013.01); *H04L 5/0048* (2013.01); *H04W 28/16* (2013.01); *H04W 72/0453* (2013.01)

(58) Field of Classification Search
CPC . H04W 72/0453; H04W 16/32; H04W 68/02; H04W 72/0413; H04W 48/16;
(Continued)

(56) References Cited

U.S. PATENT DOCUMENTS

2011/0310822 A1* 12/2011 Nair ........................ H04W 8/26
370/329
2012/0281566 A1* 11/2012 Pelletier ............ H04W 72/1221
370/252
(Continued)

FOREIGN PATENT DOCUMENTS

WO WO-2020251713 12/2020
WO WO-2021029437 A1 * 2/2021 ........... H04L 5/0005

OTHER PUBLICATIONS

AT&T., et al.,"RAN1 UE Features List for Rel-16 NR after RAN1#100bis-E", 3GPP TSG-RAN WG1 #100bis-e, 3GPP Draft, R1-2003072.zip, R1-2003073, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, May 11, 2020 (May 11, 2020), pp. 1-51, XP051883031, Retrieved from the Internet: URL: https://www.3gpp.org/ftp/tsg_ran/WG1_RL1/TSGR1_100b_e/Docs/R1-2003072.zip, R1-2003073.zip, R1-2003073 Rel16_RAN1_UE features NR after R1#100bisE.docx, [retrieved on May 11, 2020], p. 1-p. 50.
(Continued)

*Primary Examiner* — Joshua L Schwartz
(74) *Attorney, Agent, or Firm* — Thien T. Nguyen

(57) ABSTRACT

In a positioning session for a user equipment (UE), one or more base stations may receive and derive positioning measurements from uplink (UL) transmission from the UE that include a physical resource block (PRB) interlaced waveform based on at least one of interlaced physical uplink control channel (PUCCH) resource blocks, interlaced physi-
(Continued)

cal uplink shared channel (PUSCH) RBs resource blocks, interlaced sounding reference signal (SRS), interlaced uplink (UL) positioning reference signal (PRS), or a combination thereof. The interlaced waveforms span a greater wavelength than if interlacing were not used, and an enhanced accuracy requirement for the positioning measurements based on the span may be used for the positioning measurements. The UL interlaced PRBs may be used for UL positioning measurements for combined downlink (DL) and UL positioning measurements. The base station may report the positioning measurements along with the channel used and enhanced accuracy requirements to a location server for positioning.

62 Claims, 15 Drawing Sheets

(51) Int. Cl.
*H04W 72/04* (2009.01)
*H04W 28/16* (2009.01)

(58) Field of Classification Search
CPC ......... H04W 72/0446; H04W 74/0833; H04W 64/00; H04W 28/16; H04L 5/055; H04L 5/0048
See application file for complete search history.

(56) References Cited

U.S. PATENT DOCUMENTS

| | | | |
|---|---|---|---|
| 2016/0044710 A1* | 2/2016 | Lee | H04W 52/383 370/312 |
| 2016/0142957 A1* | 5/2016 | Hu | H04W 36/165 370/331 |
| 2019/0342874 A1 | 11/2019 | Davydov et al. | |

OTHER PUBLICATIONS

International Search Report and Written Opinion—PCT/US2021/030969—ISA/EPO—dated Aug. 2, 2021.

* cited by examiner

METHODS AND APPARATUS FOR USING INTERLACED PHYSICAL RESOURCE BLOCKS FOR POSITIONING MEASUREMENTS

CLAIM OF PRIORITY UNDER 35 U.S.C. § 119

This application claims under 35 USC § 119 the benefit of and priority to U.S. Provisional Application No. 63/025,076, filed May 14, 2020, entitled "METHODS AND APPARATUS FOR USING INTERLACED PHYSICAL RESOURCE BLOCKS FOR POSITIONING MEASUREMENTS," which is assigned to the assignee hereof and is incorporated herein by reference in its entirety.

BACKGROUND OF THE DISCLOSURE

1. Field of the Disclosure

Aspects of the disclosure relate generally to positioning for user equipment (UE).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

In a positioning session for a user equipment (UE), one or more base stations may receive and derive positioning measurements from uplink (UL) transmission from the UE that include a physical resource block (PRB) interlaced waveform based on at least one of interlaced physical uplink control channel (PUCCH) resource blocks, interlaced physical uplink shared channel (PUSCH) RBs resource blocks, interlaced sounding reference signal (SRS), interlaced uplink (UL) positioning reference signal (PRS), or a combination thereof. The interlaced waveforms span a greater wavelength than if interlacing were not used, and an enhanced accuracy requirement for the positioning measurements based on the span may be used for the positioning measurements. The UL interlaced PRBs may be used for UL positioning measurements for combined downlink (DL) and UL positioning measurements. The base station may report the positioning measurements along with the channel used and enhanced accuracy requirements to a location server for positioning.

In one implementation, a method for position determination of a user equipment (UE) performed by a base station in a wireless network, includes receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; deriving positioning measurements for the UE using the at least one of the interlaced PUCCH resource blocks, interlaced PUSCH resource blocks, interlaced SRS, interlaced UL PRS, or the combination thereof in the uplink transmission from the UE; and reporting to a location server measurement information for the UE based on the positioning measurements.

In one implementation, a base station in a wireless network configured to support position determination of a user equipment (UE), includes an external interface configured to communicate in the wireless network; at least one memory; at least one processor coupled to the external interface and the at least one memory, wherein the at least one processor is configured to: receive an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; derive positioning measurements for the UE using the at least one of the interlaced PUCCH resource blocks, interlaced PUSCH resource blocks, interlaced SRS, interlaced UL PRS, or the combination thereof in the uplink transmission from the UE; and report to a location server measurement information for the UE based on the positioning measurements.

In one implementation, a base station in a wireless network configured to support position determination of a user equipment (UE) includes means for receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; means for deriving positioning measurements for the UE using the at least one of the interlaced PUCCH resource blocks, interlaced PUSCH resource blocks, interlaced SRS, interlaced UL PRS, or the combination thereof in the uplink transmission from the UE; and means for reporting to a location server measurement information for the UE based on the positioning measurements.

In one implementation, a non-transitory storage medium including program code stored thereon, the program code is operable to configure at least one processor in a base station in a wireless network configured to support position determination of a user equipment (UE), includes program code to receive an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; program code to derive positioning measurements for the UE using the at least one of the interlaced PUCCH resource blocks, interlaced PUSCH resource blocks, interlaced SRS, interlaced UL PRS, or the combination thereof in the uplink transmission from the UE; and program code to report to a location server measurement information for the UE based on the positioning measurements.

In one implementation, a method for position determination of a user equipment (UE) performed by a location server in a wireless network, includes receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and determining a position for the UE using at least the measurement information.

In one implementation, a location server in a wireless network configured to support position determination of a user equipment (UE), includes an external interface configured to communicate in the wireless network; at least one memory; at least one processor coupled to the external interface and the at least one memory, wherein the at least one processor is configured to: receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and determine a position for the UE using at least the measurement information.

In one implementation, a location server in a wireless network configured to support position determination of a user equipment (UE), includes means for receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and means for determining a position for the UE using at least the measurement information.

In one implementation, a non-transitory storage medium including program code stored thereon, the program code is operable to configure at least one processor in a location server in a wireless network configured to support position determination of a user equipment (UE), includes program code to receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and program code to determine a position for the UE using at least the measurement information.

In one implementation, a method for position determination of a user equipment (UE) performed by the UE in a wireless network, includes receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

In one implementation, a user equipment (UE) in a wireless network configured to support position determination of the UE includes a wireless transceiver configured to wirelessly communicate in the wireless network; at least one memory; at least one processor coupled to the wireless transceiver and the at least one memory, wherein the at least one processor is configured to: receive an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; transmit uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

In one implementation, a user equipment (UE) in a wireless network configured to support position determination of the UE includes means for receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; means for transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

In one implementation, a non-transitory storage medium including program code stored thereon, the program code is operable to configure at least one processor in a user equipment (UE) in a wireless network configured to support position determination of the UE includes program code to receive an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; program code to transmit uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
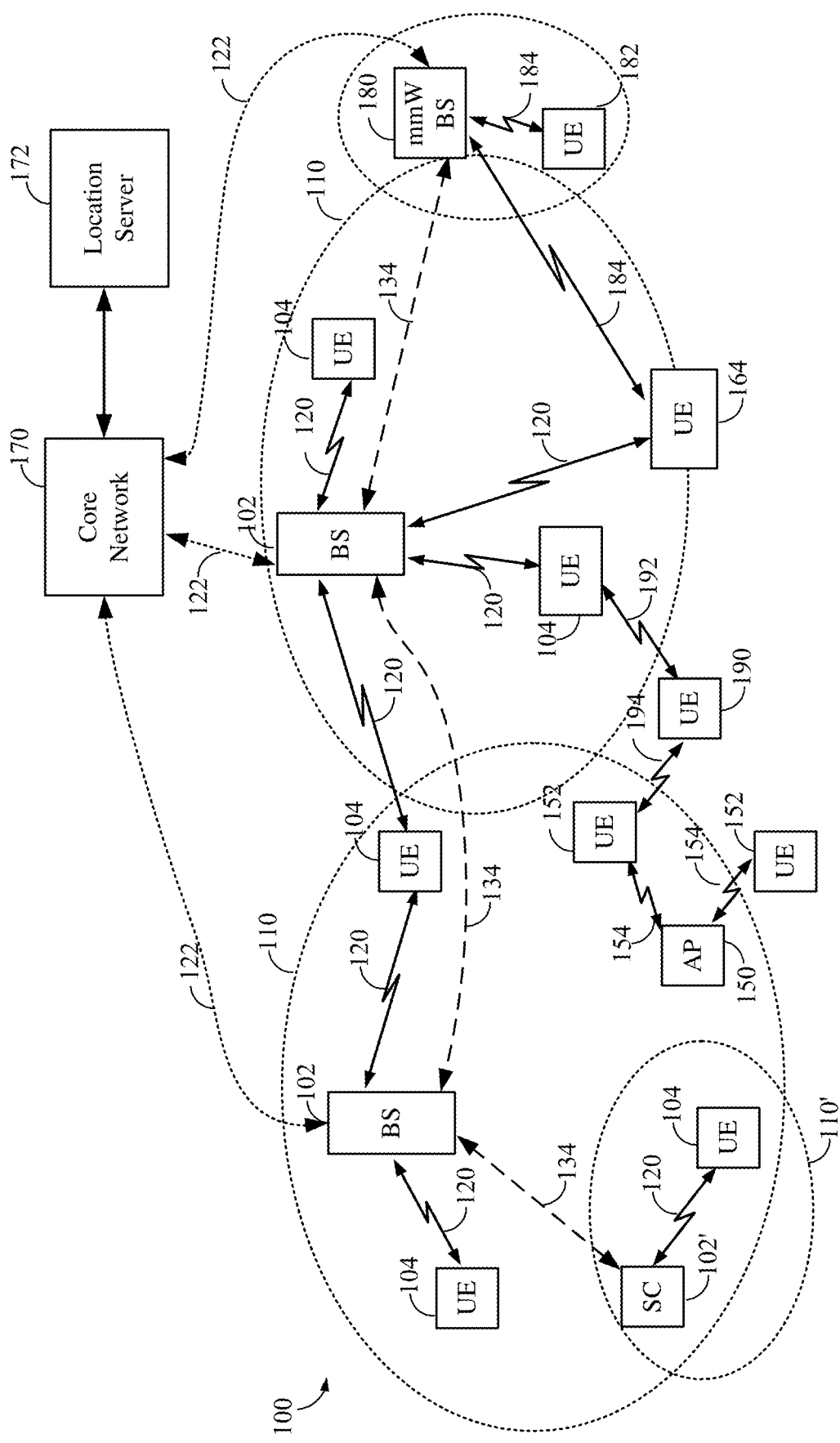
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure.

Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network.

LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000

MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
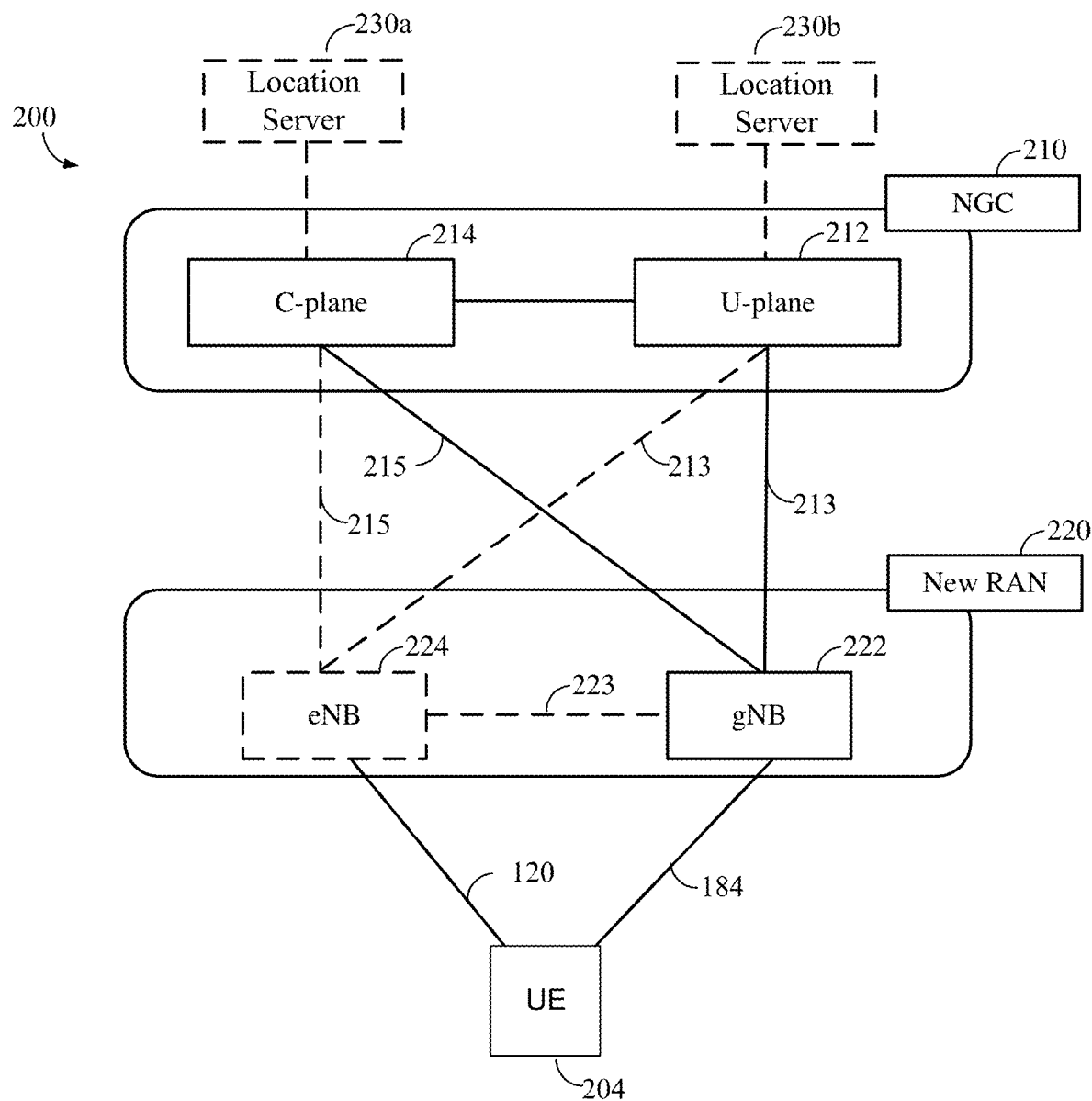
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230*a*, 230*b* (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
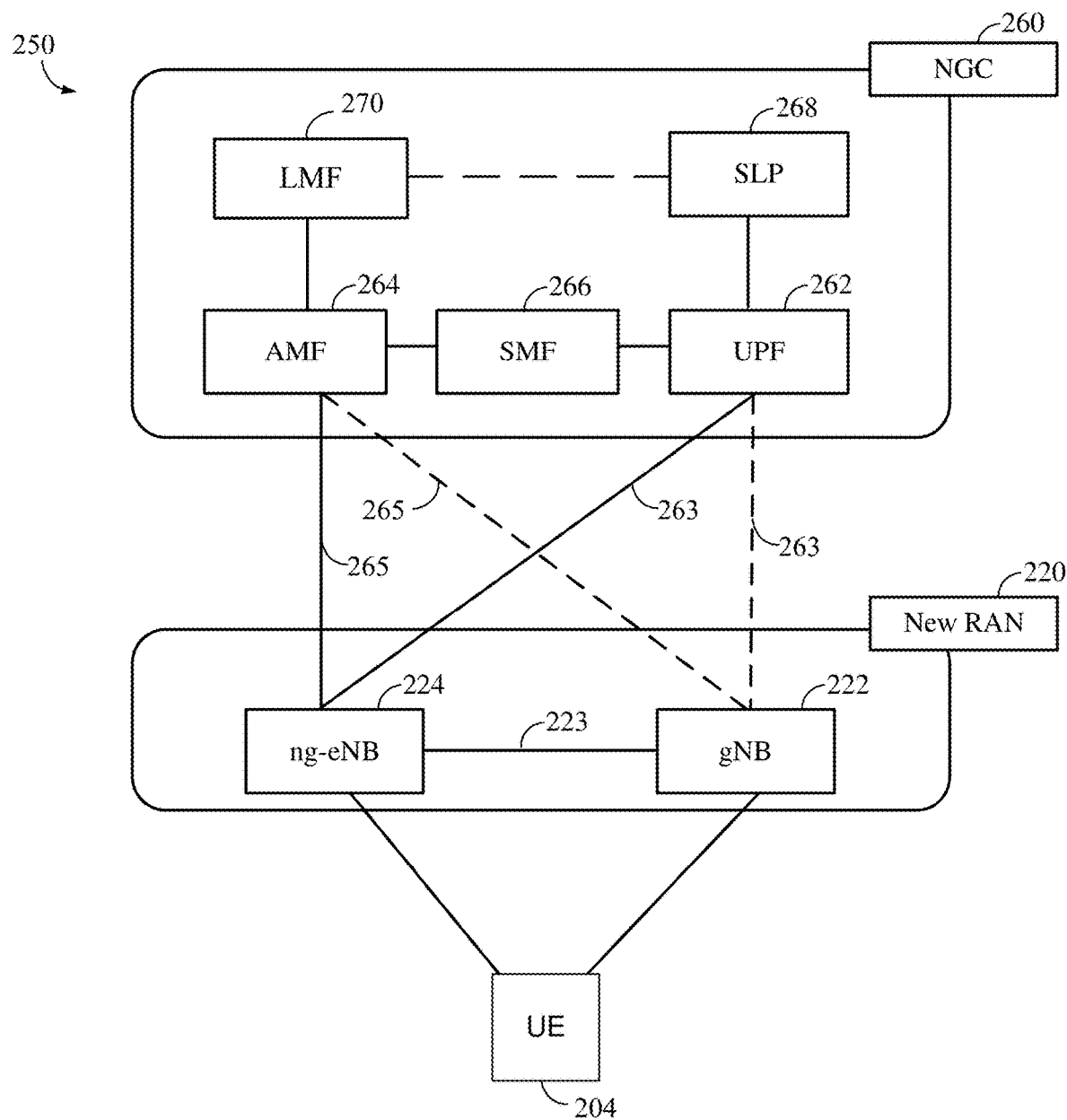

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
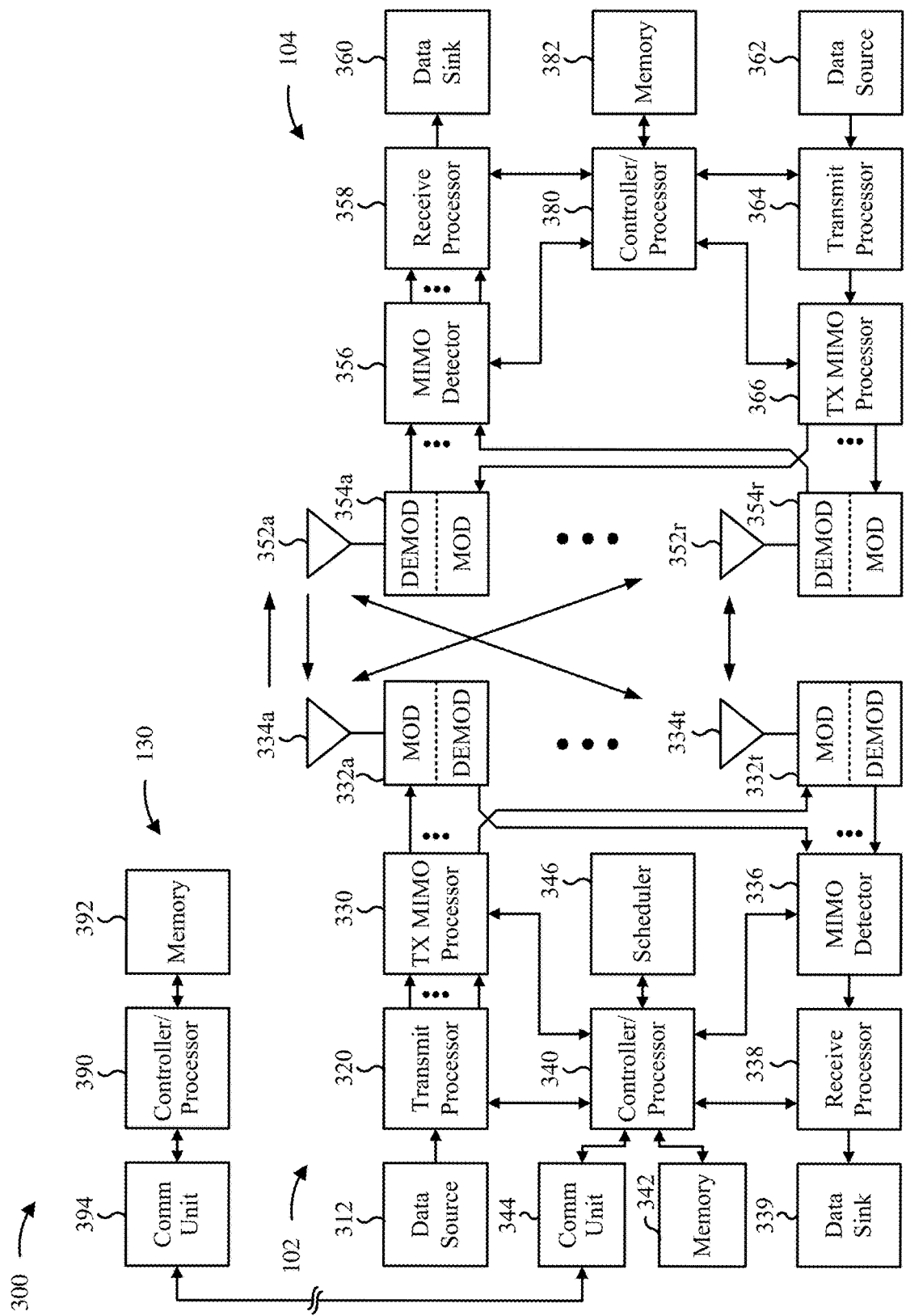
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T>1 and R>1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 130 via communication unit 344. Network controller 130 may include communication unit 394, controller/processor 390, and memory 392.

Controller/processor 340 of base station 102, controller/processor 380 of UE 104, and/or any other component(s) of FIG. 3 may perform one or more techniques associated with position measurement of UL transmissions that include interlaced PRBs, as described in more detail elsewhere herein. For example, controller/processor 340 of base station 102, controller/processor 380 of UE 104, and/or any other component(s) of FIG. 3 may perform or direct operations of, for example, process 1000 of FIG. 10, process 1100 of FIG. 11, and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, process 1000 of FIG. 10, process 1100 of FIG. 11, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
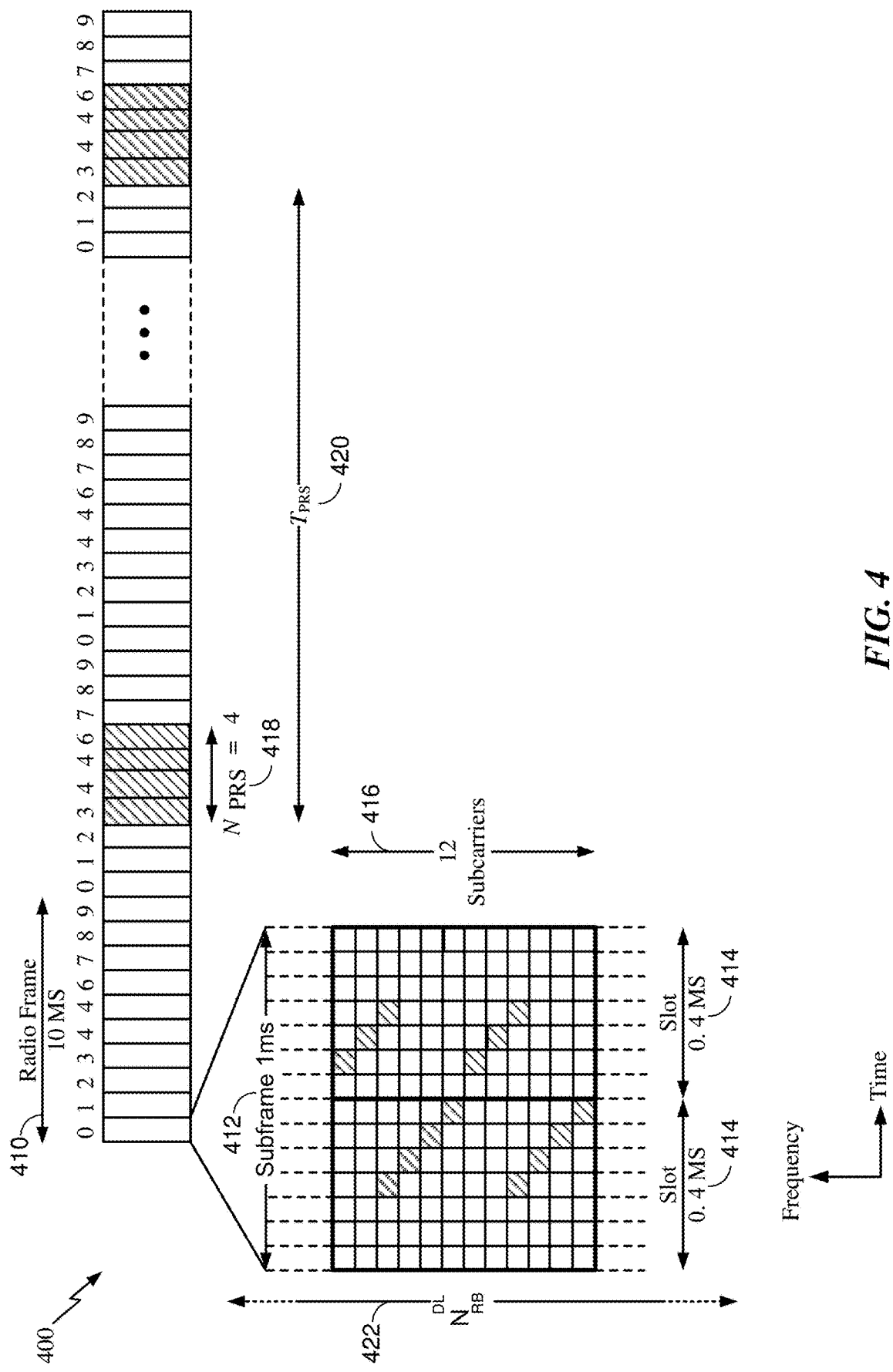
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations and/or UL PRS transmitted to base stations, the UE may perform various positioning measurement, such as time of arrival (TOA), reference signal time difference (RSTD), time difference of arrival (TDOA), reference signal received power (RSRP), time difference between reception and transmission of signals (Rx-Tx), angle of arrival (AoA), or angle of departure (AoD), etc. In some implementations, the DL PRS and UL PRS are received and transmitted jointly to perform multi-cell positioning measurements, such as multi-Round Trip Time (RTT).

Various positioning technologies rely on DL PRS or UL PRS (or SRS for positioning). For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

Figure 5:
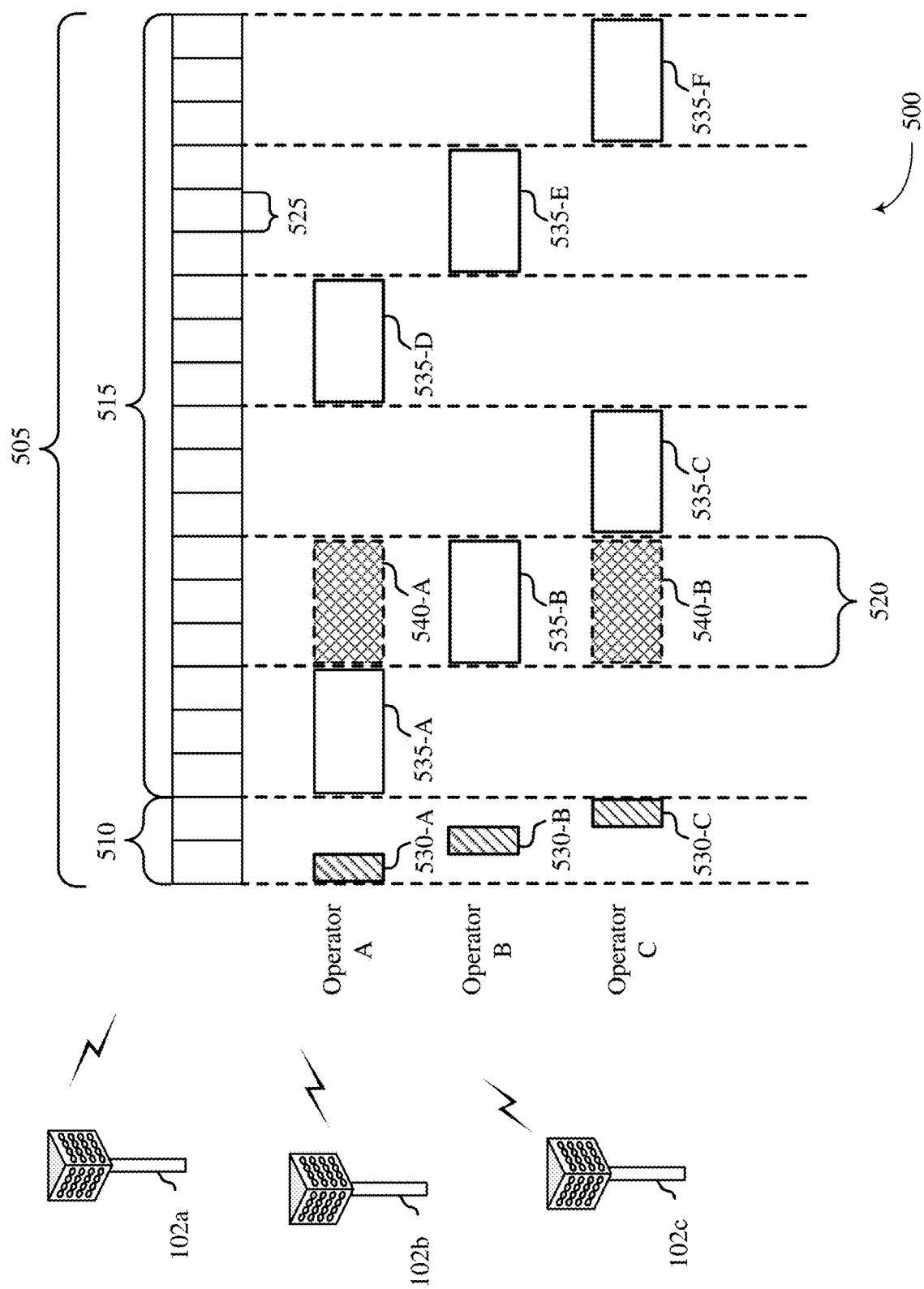
FIG. 5 illustrates an example of a timing diagram for coordinated resource partitioning.

FIG. 5 illustrates an example of a timing diagram 500 for coordinated resource partitioning. The timing diagram 500 includes a superframe 505, which may represent a fixed duration of time (e.g., 20 ms). Superframe 505 may be repeated for a given communication session and may be used by a wireless system such as wireless system 100 described with reference to FIG. 1. The superframe 505 may be divided into intervals such as an acquisition interval (A-INT) 510 and an arbitration interval 515. As described in more detail below, the A-INT 510 and arbitration interval 515 may be subdivided into sub-intervals, designated for certain resource types, and allocated to different network operating entities to facilitate coordinated communications between the different network operating entities. For example, the arbitration interval 515 may be divided into a plurality of sub-intervals 520. Also, the superframe 505 may be further divided into a plurality of subframes 525 with a fixed duration (e.g., 1 ms). While timing diagram 500 illustrates three different network operating entities (e.g., Operator A, Operator B, Operator C), the number of network operating entities using the superframe 505 for coordinated communications may be greater than or fewer than the number illustrated in timing diagram 500.

The A-INT 510 may be a dedicated interval of the superframe 505 that is reserved for exclusive communications by the network operating entities. In some examples, each network operating entity may be allocated certain resources within the A-INT 510 for exclusive communications. For example, resources 530-A may be reserved for exclusive communications by Operator A, such as through base station 102a, resources 530-B may be reserved for exclusive communications by Operator B, such as through base station 102b, and resources 530-C may be reserved for exclusive communications by Operator C, such as through base station 102c. Since the resources 530-A are reserved for exclusive communications by Operator A, neither Operator B nor Operator C can communicate during resources 530-A, even if Operator A chooses not to communicate during those resources. That is, access to exclusive resources is limited to the designated network operator. Similar restrictions apply to resources 530-B for Operator B and resources 530-C for Operator C. The wireless nodes of Operator A (e.g., UEs 104 or base stations 102) may communicate any information desired during their exclusive resources 530-A, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 510 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 535-A may be prioritized for use by Operator A and may therefore be referred to as a G-INT for Operator A (e.g., G-INT-OpA). Similarly, resources 535-B may be prioritized for Operator B, resources 535-C may be prioritized for Operator C, resources 535-D may be prioritized for Operator A, resources 535-E may be prioritized for Operator B, and resources 535-F may be prioritized for operator C.

The various G-INT resources illustrated in FIG. 5 appear to be staggered to illustrate their association with their respective network operating entities, but these resources may all be on the same frequency bandwidth. Thus, if viewed along a time-frequency grid, the G-INT resources may appear as a contiguous line within the superframe 505. This partitioning of data may be an example of time division multiplexing (TDM). Also, when resources appear in the same sub-interval (e.g., resources 540-A and resources 535-B), these resources represent the same time resources with respect to the superframe 505 (e.g., the resources occupy the same sub-interval 520), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 535-A without interference from the wireless nodes of Operator B or Operator C.

A network operating entity may additionally signal to another operator that it intends to use a particular G-INT. For example, referring to resources 535-A, Operator A may signal to Operator B and Operator C that it intends to use resources 535-A. Such signaling may be referred to as an activity indication. Moreover, since Operator A has priority over resources 535-A, Operator A may be considered as a higher priority operator than both Operator B and Operator C. However, as discussed above, Operator A does not have to send signaling to the other network operating entities to ensure interference-free transmission during resources 535-A because the resources 535-A are assigned with priority to Operator A.

Similarly, a network operating entity may signal to another network operating entity that it intends not to use a particular G-INT. This signaling may also be referred to as an activity indication. For example, referring to resources 535-B, Operator B may signal to Operator A and Operator C that it intends not to use the resources 535-B for communication, even though the resources are assigned with priority to Operator B. With reference to resources 535-B, Operator B may be considered a higher priority network operating entity than Operator A and Operator C. In such cases, Operators A and C may attempt to use resources of sub-interval 520 on an opportunistic basis. Thus, from the perspective of Operator A, the sub-interval 520 that contains resources 535-B may be considered an opportunistic interval (O-INT) for Operator A (e.g., O-INT-OpA). For illustrative purposes, resources 540-A may represent the O-INT for Operator A. Also, from the perspective of Operator C, the same sub-interval 520 may represent an O-INT for Operator C with corresponding resources 540-B. Resources 540-A, 535-B, and 540-B all represent the same time resources (e.g., a particular sub-interval 520), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 535-B (e.g., G-INT-OpB), then Operator A may use those same resources (e.g., represented by resources 540-A) by first checking the channel for interference (e.g., LBT) and then transmitting data if the channel was determined to be clear. Similarly, if Operator C wanted to access resources on an opportunistic basis during sub-interval 520 (e.g., use an O-INT represented by resources 540-B) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 520, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example, an operating entity may employ CoMP and dynamic time division duplex (TDD) in a G-INT and opportunistic CoMP in an O-INT as needed.

In the example illustrated in FIG. 5, each sub-interval 520 includes a G-INT for one of Operator A, B, or C. However, in some cases, one or more sub-intervals 520 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 525 may contain 14 symbols (e.g., 250-µs for 60 kHz tone spacing). These subframes 525 may be standalone, self-contained Interval-Cs (ITCs) or the subframes 525 may be a part of a long ITC. An ITC may be a self-contained transmission starting with a downlink transmission and ending with an uplink transmission. In some embodiments, an ITC may contain one or more subframes 525 operating contiguously upon medium occupation. In some cases, there may be a maximum of eight network operators in an A-INT 510 (e.g., with duration of 2 ms) assuming a 250-µs transmission opportunity.

Although three operators are illustrated in FIG. 5, it should be understood that fewer or more network operating entities may be configured to operate in a coordinated manner as described above. In some cases, the location of the G-INT, O-INT, or A-INT within superframe 505 for each operator is determined autonomously based on the number of network operating entities active in a system. For example, if there is only one network operating entity, each sub-interval 520 may be occupied by a G-INT for that single network operating entity, or the sub-intervals 520 may alternate between G-INTs for that network operating entity and O-INTs to allow other network operating entities to enter. If there are two network operating entities, the sub-intervals 520 may alternate between G-INTs for the first network operating entity and G-INTs for the second network operating entity. If there are three network operating entities, the G-INT and O-INTs for each network operating entity may be designed as illustrated in FIG. 5. If there are four network operating entities, the first four sub-intervals 520 may include consecutive G-INTs for the four network operating entities and the remaining two sub-intervals 520 may contain O-INTs. Similarly, if there are five network operating entities, the first five sub-intervals 520 may contain consecutive G-INTs for the five network operating entities and the remaining sub-interval 520 may contain an O-INT. If there are six network operating entities, all six sub-intervals 520 may include consecutive G-INTs for each network operating entity. It should be understood that these examples are for illustrative purposes only and that other autonomously determined interval allocations may be used.

It should be understood that the coordination framework described with reference to FIG. 5 is for illustration purposes only. For example, the duration of superframe 505 may be more or less than 20 ms. Also, the number, duration, and location of sub-intervals 520 and subframes 525 may differ from the configuration illustrated. Also, the types of resource designations (e.g., exclusive, prioritized, unassigned) may differ or include more or less sub-designations.

In unlicensed spectrum operations, there may be a power spectral density (PSD) limit on the maximum power applied per MHz (e.g., 10 dBm/MHz, 13 dBm/MHz, 15 dBm/MHz, etc.). As the maximum power for a UE is generally limited (e.g., 23 dBm), interlaced allocations may be useful in order to transmit using full transmit power but without using the full channel bandwidth. A uniform interlace, for example, may comprise 1 resource block (RB) every N RBs in a uniform pattern (e.g., RB N, N+10, N+20, . . . N+90). Different interlaces may have different numbers of RBs based on the system bandwidth. Uniform, for purposes of this disclosure, refers to the uniform spacing between these RBs.

Figure 6:
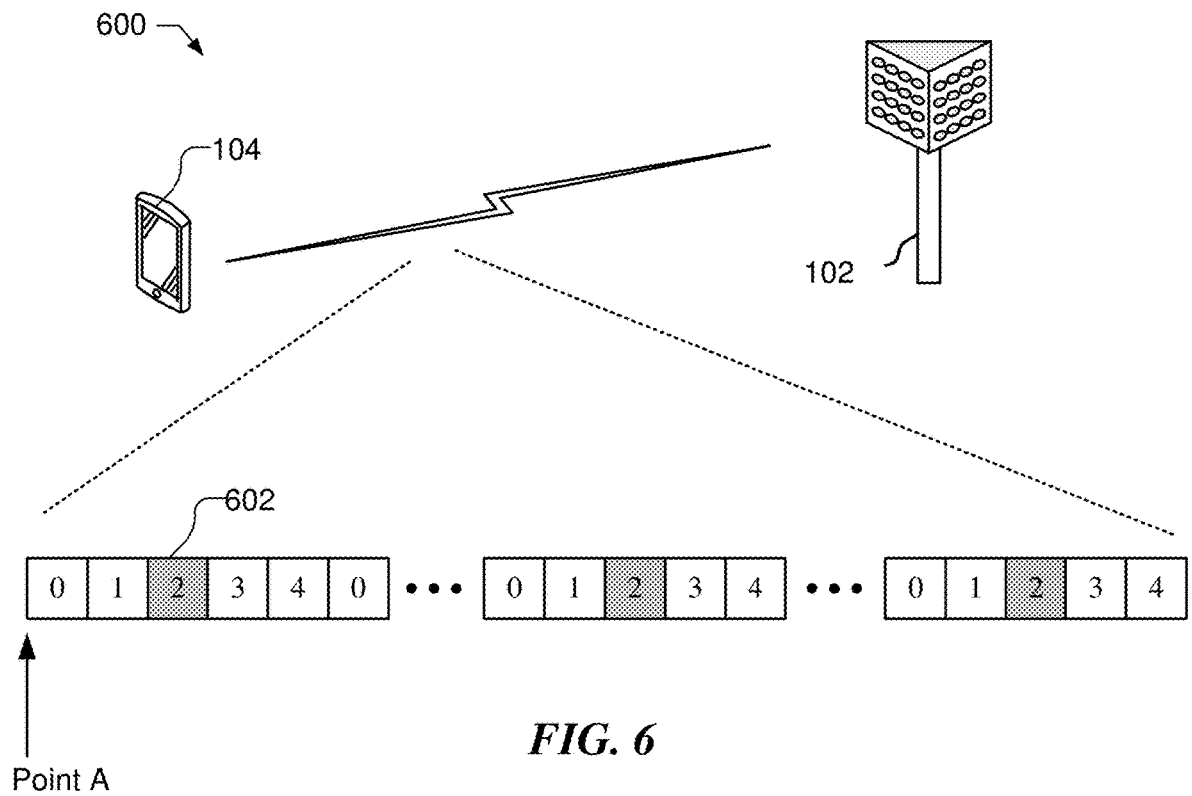
FIG. 6 is a block diagram illustrating an example of an uplink (UL) PRB block interlaced waveform that is formed and transmitted by the UE to a base station, which may be used for position measurements.

FIG. 6 is a block diagram illustrating an example of an uplink (UL) PRB block interlaced waveform 600 that is formed and transmitted by the UE 104 to a base station 102, each configured according to one aspect of the present disclosure. The interlaced waveform 600, for example, is illustrated as including 1 resource block (RB) (or a set of contiguous RBs) that repeat every 5 RBs (or every 5 sets of contiguous RBs) in a uniform pattern, although different interlaces may be used if desired. By way of example, when operating in 5 GHz band, regulations provide a PSD limitation on the maximum power applied per MHz (e.g., 10 dBm/MHz). Additionally, some regulations require an Occupied Channel Bandwidth (OCB) (e.g., 80% of 20 MHz). Thus, the frequency allocation a UE 104 must vary between sub-frames in such a way that the OCB requirement is fulfilled.

Uplink (UL) interlaced transmissions allows signals with small bandwidth (BW) higher transmission power when needed. The interlacing transmissions may be performed on a Physical Resource Block (PRB) basis. Block-Interleaved Frequency Division Multiple Access (FDMA) (B-IFDMA) is a baseline uplink transmission scheme that may be used for any uplink transmission in unlicensed spectrum. For B-IFDMA, one carrier may be divided into a number M interlaces (M=10 for 20 MHz carrier, and M=5 for 10 MHz carrier), and each interlace may include N equally spaced resource blocks in frequency domain. For example, N=10 for both 10 MHz and 20 MHz carrier.

The physical uplink shared channel (PUSCH) and physical uplink control channel (PUCCH) need to be designed to satisfy these regulations in regions in which they apply. Additionally, SRS or UL PRS may be designed to satisfy these regulations. Similar to LTE-LAA, a PRB block interlace waveform may be used for PUCCH and PUSCH, as well as SRS or UL PRS. By way of example, RB2 602 may be one of PUCCH, PUSCH, SRS, or UL PRS, and is interlaced with other resource blocks RB0, RB1, RB3, RB4. Point A may be the reference for the interlace definition. By way of example, for 15 kHz subcarrier spacing (SCS), M=10 interlaces and for 30 kHz SCS, M=5 interlaces for all bandwidths. For PUSCH, both Discrete Fourier Transform-spread (DFT-s) and cyclic prefix (CP) Orthogonal Frequency Division Multiplexing (OFDM) are supported under the interlace waveform.

The legacy waveform, e.g., illustrated in FIG. 6, is supported even in regions without OCB requirement and full power transmit power is not needed. The interlaced waveform for common and dedicated PUCCH and PUSCH, as well as SRS and UL PRS are separately configured, but the UE will not expect the configuration to be different in a given cell. Additionally, there is no dynamic switching of the waveform.

PUCCH is extended to interlace waveform within one 20 MHz only. Either 10 RBs or 11 RBs may be used with interlaced PUCCH. For example, PUCCH Format 3 (PF3) will only use the first 10RB if allocated with an interlace with 11 RBs. PUCCH Formats 0 and 1 (PF0 and PF1) is extended to one interlace using one RB. Cyclic shift ramping may be used across PRBs for better peak-to-average power ratio (PAPR). Additionally, PUCCH Formats 2 and 3 (PF2) and PF3) are extended to one or two interlaces from 1-16 TBs. Interlaced PF2 further supports frequency domain orthogonal cover code (OCC) (1/2/4) to support user multiplexing when only one interlace is configured. Interlaced PF3 further supports pre-DFT OCC (1/2/4) to support user multiplexing when only one interlace is configured.

Interlaced PUSCH has been introduced for both DFT-s waveform and CP-OFDM waveform. For DFT-s version of interlaced PUSCH, if the allocated number of RBs is not in the form of $2^a3^b5^c$, the ending RBs may be dropped. For resource allocation, interlace assignment and RB set assignment is included. For example, X bits may be used for interlace assignment. For example, for 30 kHz SCS, X=5 (5-bit bitmap to indicate all possible interlace combinations. For 15 kHz SCS, X=6 bits to indicate start interlace index and number of contiguous interlace indices (RIV) and using remaining up to 9 RIV values to indicate specific pre-defined interlace combinations. For example, the design may be same as for LTE-LAA. Additionally, Y bits may be used for RB set assignment (for Downlink Control Information (DCI) 0_1). The RB set assignment is RIV format for starting and ending RB sets and may be always continuous. When two adjacent RB sets are assigned, the guard band in-between is also assigned.

Figure 7:
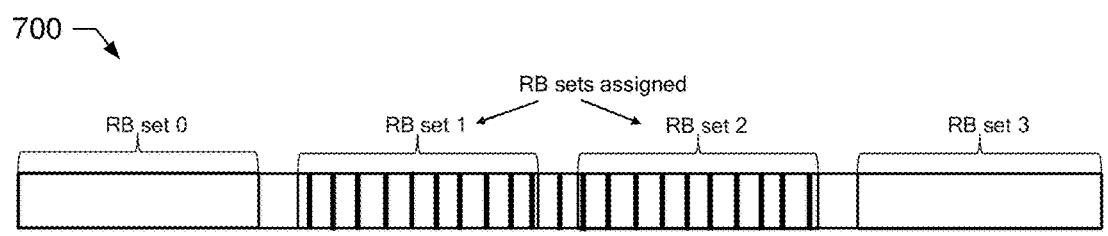
FIG. 7 illustrates the assignment of resource blocks (RBs) for an interlaced PUSCH.

FIG. 7, by way of example, illustrates a waveform 700 with the assignment of resource blocks (RBs) for an interlaced PUSCH. The waveform 700, for example, shows four sets of RBs, with RB set 1 and RB set 2 assigned for PUSCH, and inside each RB set there are interlaces. The lines in RB set 1 and RB 2, for example, correspond to the RBs of one of the interlaces inside the set.

In one implementation, the UL interlaced PRBs, e.g., one or more of the interlaced PUCCH, interlaced PUSCH, interlaced SRS, interlaced UL PRS, or a combination thereof, may be used by the base station 102 for positioning measurements. An interlaced transmission, e.g., of one or more of interlaced PUCCH/PUSCH/SRS/UL PRS, acts as an RB-level comb and results in an UL transmission that spans over a greater bandwidth than a non-interlaced transmission. For example, referring to FIG. 6, each resource block RB0, RB1, RB2, RB3, RB4, is a single resource block or a set of contiguous resource blocks. The RB2 602 may be for UL channels (e.g., PUCCH, PUSCH, SRS, or UL PRS) interlaced with other resource blocks and may be used by the base station 102 for UL-only positioning measurements (e.g., RTOA, AoA, RSRP) or for DL/UL positioning measurements (e.g., Multi-RTT).

By way of example, with regards to the interlaced PUSCH, the base station 102 may use the Demodulated Reference Signal of the PUSCH as a positioning reference signal, e.g., UL PRS, since it is another reference signal. The base station 102 may additionally use the data of the PUSCH, if the network first decodes them, and then reconstructs what was transmitted, so that it can treat them as another positioning reference signal. Interlaced PUCCH may be processed similarly by the base station 102 so that the PUCCH may be treated as another positioning reference signal.

The accuracy requirements for a positioning measurement that is derived from such interlaced transmissions is associated to the span of the bandwidth (i.e., the bandwidth of the last resource block minus the bandwidth of the first resource block), as opposed to the summation of the occupied resource blocks. Thus, the accuracy requirement for the positioning measurements may be proportional or approximately proportional to: (Number of Interlaces)*(Number of RBs per interlace).

Thus, a base station 102 (or TRP) may report location information to the location server including the positioning measurements, as well as whether a positioning measurement was derived using interlaced channels, e.g., interlaced PUCCH, interlaced PUSCH, interlaced SRS, interlaced UL PRS, or a combination thereof. The base station 102 may further include in the location information an indication of which channel was used to derive the positioning measurements. The base station 102 may further report in the location information the enhanced accuracy requirements, e.g., based on the bandwidth span.

Figure 8:
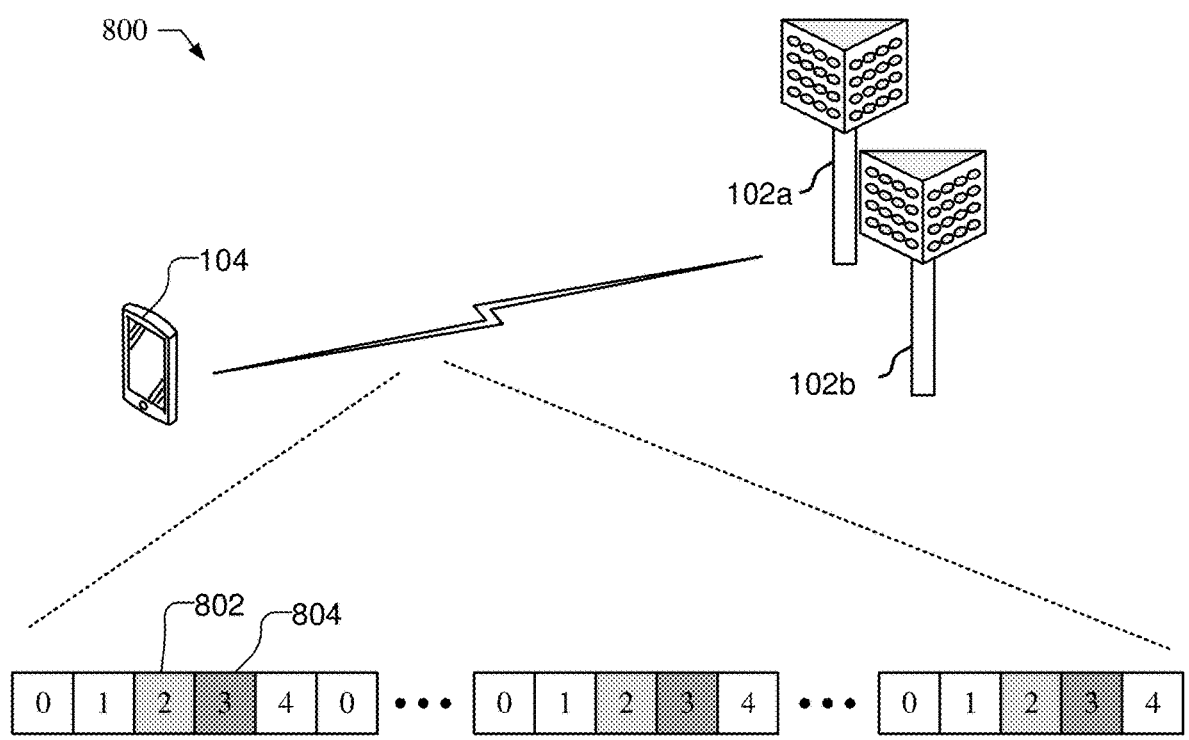
FIG. 8 is a block diagram illustrating an example of an UL PRB block interlaced waveform that is formed and transmitted by the UE to multiple base stations, which may be used for position measurements.

FIG. 8 is a block diagram illustrating an example of an uplink (UL) PRB block interlaced waveform 800 that is formed and transmitted by the UE 104 to multiple base stations 102a, 102b, each configured according to one aspect of the present disclosure. When there are multiple base stations, or TRPs, the PUCCH, PUSCH, SRS, or UL PRS, for different base stations may appear on a different interlace. For example, as illustrated in FIG. 8, the interlaced resource block RB2 802, which may be (e.g., PUCCH, PUSCH, SRS, or UL PRS), is for base station 102a, while RB3 804, which may be (e.g., PUCCH, PUSCH, SRS, or UL PRS), is for base station 102b. Each base station 102a, 102b may use their respective interlaced resource block, RB2 802 and RB3 804, respectively, for UL-only or DL/UL positioning measurements for the UE 104.

As discussed above, each of the base stations (or TRPs) 102a, 102b participating in the reception and performing positioning measurements of the UL interlaced channels (e.g., one or more of the interlaced PUCCH, interlaced PUSCH, interlaced SRS, interlaced UL PRS, or a combination thereof) may transmit location information to the location server that includes the positioning measurements (RTOA, AoA, RSRP). The base stations 102a, 102b may each include in the location information an indication of which channel was used to derive the positioning measurements. The base stations 102a, 102b may each further report in the location information the enhanced accuracy requirements, e.g., based on the bandwidth span of their respective interlaced channel.

In some implementations, the use of interlaced channels for positioning measurements may be used in unlicensed bands, e.g., where the interlace structure for channels, such as PUCCH/PUSCH, has been defined. For example, for positioning measurements, the same number of interlaces as those already existing for unlicensed may be supported, e.g., 5 interlaces for 30 kHz and 10 interlaces for 15 kHz.

In one implementation, the definitions use for UL measurements may be changed to include the PUCCH and PUSCH channels. By way of example, the definition of UL Relative Time of Arrival ($T_{UL\text{-}RTOA}$) may state the UL Relative Time of Arrival ($T_{UL\text{-}RTOA}$) is the beginning of subframe i containing PUCCH, PUSCH, or SRS received in positioning node j, relative to the configurable reference time. Multiple PUCCH, PUSCH, or SRS resources for positioning can be used to determine the beginning of one subframe containing PUCCH, PUSCH, or SRS received at a positioning node. The reference point for $T_{UL\_RTOA}$ shall be: —for type 1-C base station 3GPP TS 38.104: the Rx antenna connector, —for type 1-O or 2-O base station 3GPP TS 38.104: the Rx antenna, —for type 1-H base station 3GPP TS 38.104: the Rx Transceiver Array Boundary connector. Multiple PUCCH or PUSCH may be used to determine an UL measurement.

In another example, the definition of gNB Rx-Tx time difference may state The gNB Rx-Tx time difference is defined as $T_{gNB\text{-}RX} - T_{gNB\text{-}TX}$, where: $T_{gNB\text{-}RX}$ is the positioning node received timing of uplink subframe #i containing PUCCH, PUSCH, or SRS associated with UE, defined by the first detected path in time. $T_{gNB\text{-}TX}$ is the positioning node transmit timing of downlink subframe #j that is closest in time to the subframe #i received from the UE. Multiple PUCCH, PUSCH, or SRS resources for positioning can be used to determine the start of one subframe containing PUCCH, PUSCH, or SRS. The reference point for $T_{gNB\text{-}RX}$ shall be: —for type 1-C base station 3GPP TS 38.104: the Rx antenna connector, —for type 1-O or 2-O base station 3GPP TS 38.104: the Rx antenna, —for type 1-H base station 3GPP TS 38.104: the Rx Transceiver Array Boundary connector. The reference point for $T_{gNB\text{-}TX}$ shall be: —for type 1-C base station 3GPP TS 38.104: the Tx antenna connector, —for type 1-O or 2-O base station 3GPP TS 38.104: the Tx antenna, —for type 1-H base station 3GPP TS 38.104: the Tx Transceiver Array Boundary connector.

Figure 9:
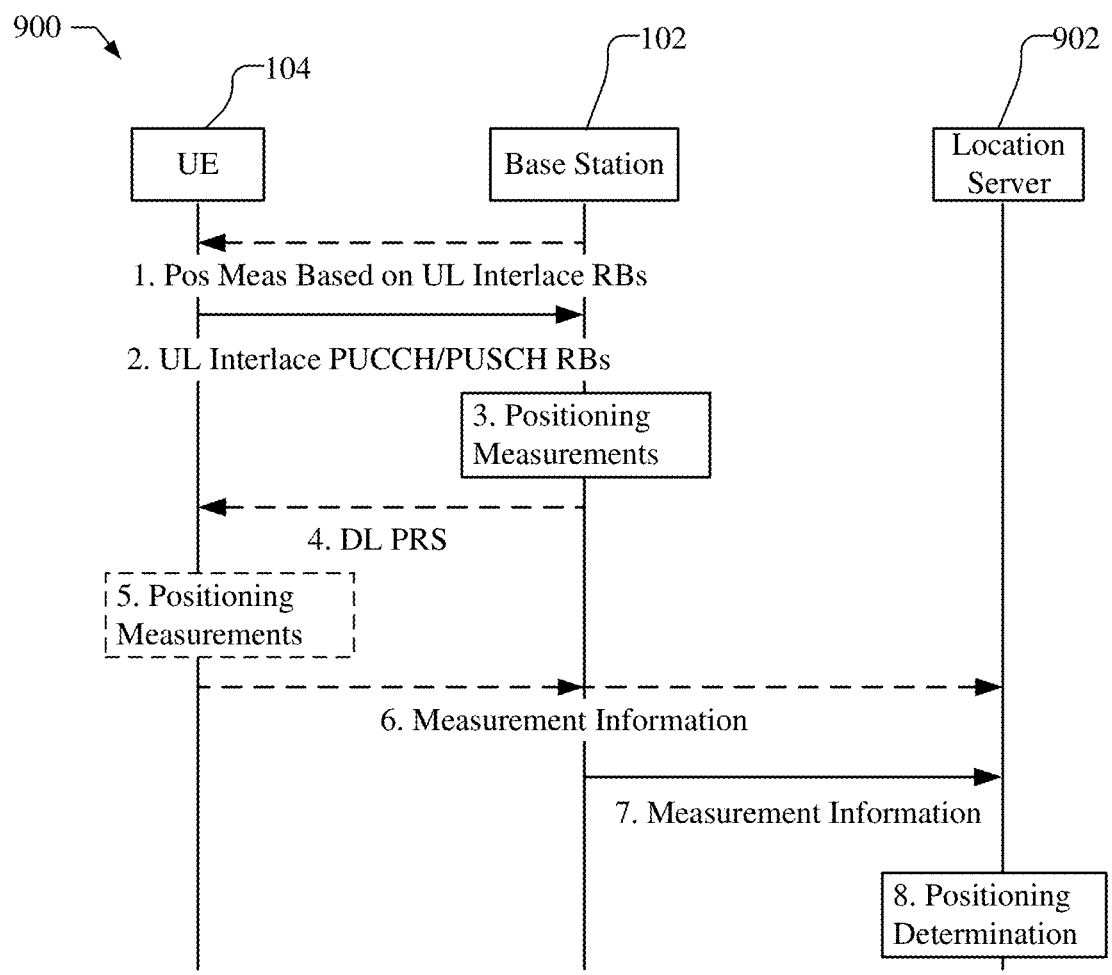
FIG. 9 shows a signaling flow that illustrates various messages sent between components of the wireless communication system in a positioning session that includes positioning measurements using UL interlaced channels.

FIG. 9 shows a signaling flow 900 that illustrates various messages sent between components of the wireless communication system 100 depicted in FIG. 1, in a positioning session that includes positioning measurements using UL interlaced channels as discussed herein. Flow diagram 900 illustrates UE 104, a base station 102, which may be an eNB or gNB, and a location server 902, which may be, e.g., location server 172, 230a, 230b, or LMF 270. While the flow diagram 900 is discussed, for ease of illustration, in relation to a 5G NR wireless access, signaling flows similar to FIG. 9 involving other types of high frequency networks and base stations will be readily apparent to those with ordinary skill in the art. FIG. 9 illustrates implementations for several different positioning methods that may be used separately or combined. For example, one or more of UL-only positioning measurements (e.g., RTOA, AoA, RSRP) may be performed or combined UL and DL positioning measurements, e.g., for RTT or M-RTT may be performed. In the signaling flow 900, it is assumed that the UE 104 and location server 902 communicate using the LPP positioning protocol, although use of NPP or a combination of LPP and NPP or other future protocol, such as NRPPa, is also possible. Further, FIG. 9 may not show all messages transmitted between entities in a positioning session.

At stage 1, in an optional step, the base station 102 may transmit a message to the UE 104 indicating that positioning measurements will be performed on UL interlaced resource blocks for one or more of PUCCH, PUSCH, SRS, or UL PRS. The indication may be provided, for example, if a combined UL/DL positioning measurement, such as RTT is to be performed.

At stage 2, the UE 104 transmits an UL PRB interlaced waveform, which includes at least one of interlaced PUCCH resource blocks, interlaced PUSCH resource blocks, interlaced SRS, interlaced UL PRS, or a combination thereof. The PRB interlaced waveform, for example, is a waveform formed by an interlaced uplink resource allocation, wherein the interlaced uplink resource allocation comprises a basic unit of resource allocation which is composed of M equally spaced sets of PRBs. Each set of consecutive PRBs may contain an equal number of PRBs, and may be one PBR or more PRBs, or at least two sets of consecutive PRBs contain an unequal number of PRBs. The at least one of the interlaced PUCCH resource blocks, interlaced PUSCH resource blocks, interlaced SRS, interlaced UL PRS, or the combination thereof spans an increased bandwidth than if the resource blocks were not interlaced. If multiple base stations (not shown) are performing measurements, one or more of the interlaced PUCCH resource blocks, interlaced PUSCH resource blocks, interlaced SRS, interlaced UL PRS, or the combination thereof may be designated for one particular base station. The uplink transmission from the UE may be on an unlicensed frequency band At stage 3, the base station 102 performs positioning measurements using the UL PRB interlaced waveform including at least one of interlaced PUCCH resource blocks, interlaced PUSCH resource blocks, interlaced SRS, interlaced UL PRS, or a combination thereof, received at stage 2. The positioning measurements, for example, may be RTOA, AoA, RSRP. The positioning measurements may be performed with an enhanced accuracy requirement due to the increase in bandwidth span of the resource blocks, which may be proportional based on the span of the bandwidth, e.g., proportional to a product of a number of interlaces and a number of resource blocks per interlace.

At stage 4, the base station 102 may optionally transmit downlink PRS signals, e.g., if combined UL/DL positioning measurements, such as RTT or Multi-RTT is to be performed.

At stage 5, the UE 104 may perform positioning measurements from the DL PRS, if transmitted at stage 4. For example, the UE 104 may perform TOA measurements or Rx-Tx measurements.

At stage 6, the UE 104 may transmit location information to the base station 102 or the location server 902 that includes the positioning measurements if performed at stage 5.

At stage 7, the base station 102 may transmit location information to the location server 902. The location information, for example, may include the UL positioning measurements performed by the base station 102 at stage 3, as well as location information provided by the UE 104 at stage 6 for combined UL/DL positioning measurements if the UE 104 provided the location information to the base station 102. The location information may further include, e.g., an indication of which interlace channel was used to derive the positioning measurements. The location information may further include enhanced accuracy requirements, e.g., such as an indication in the bandwidth span.

At stage 8, the location server 902 determines the UE location based on the positioning measurements provided in the location information received from the base station at stage 7 and location information received from the UE 104 at stage 6, if any.

Figure 10:
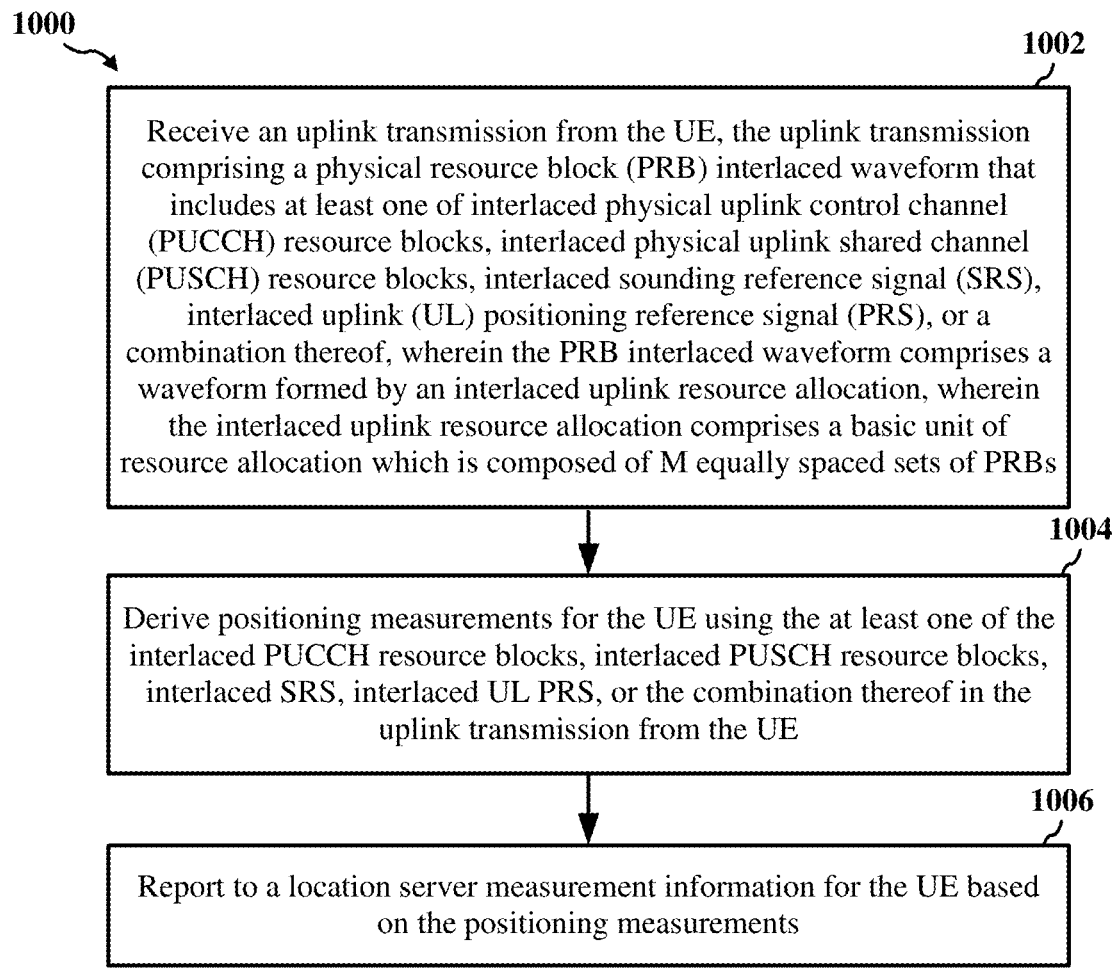
FIG. 10 shows a flowchart for an exemplary method for position determination of a UE performed by a base station in a wireless network.

FIG. 10 shows a flowchart for an exemplary method 1000 for position determination of a UE, such as UE 104, performed by a base station in a wireless network, such as base station 102 in wireless network 100 shown in FIG. 1.

At block 1002, the base station receives an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs, e.g., as discussed at stage 2 of FIG. 9. A means for receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs may be, e.g., the wireless transceiver 1310 and one or more processors 1302 with dedicated hardware or implementing executable code or software instructions in memory 1304 and/or medium 1320 such as the UL interlace PRBs module 1322, as discussed in FIG. 13 below.

At block 1004, positioning measurements are derived for the UE using the at least one of the interlaced PUCCH resource blocks, interlaced PUSCH resource blocks, interlaced SRS, interlaced UL PRS, or the combination thereof in the uplink transmission from the UE, e.g., as discussed at stage 3 of FIG. 9. A means for deriving positioning measurements for the UE using the at least one of the interlaced PUCCH resource blocks, interlaced PUSCH resource blocks, interlaced SRS, interlaced UL PRS, or the combination thereof in the uplink transmission from the UE may be, e.g., the one or more processors 1302 with dedicated hardware or implementing executable code or software instructions in memory 1304 and/or medium 1320 such as the positioning measurements module 1324, as discussed in FIG. 13 below.

At block 1006, the base station reports to a location server measurement information for the UE based on the positioning measurements, e.g., as discussed at stage 7 of FIG. 9. A means for reporting to a location server measurement information for the UE based on the positioning measurements may be, e.g., the communications interface 1316 and one or more processors 1302 with dedicated hardware or implementing executable code or software instructions in memory 1304 and/or medium 1320 such as the report module 1330, as discussed in FIG. 13 below.

In one implementation, each set of consecutive physical resource blocks may contain an equal number of physical resource blocks, e.g., as discussed at stage 2 of FIG. 9. In one implementation, each set of physical resource blocks may contain one physical resource block, e.g., as discussed at stage 2 of FIG. 9. In one implementation, at least two sets of consecutive physical resource blocks may contain an unequal number of physical resource blocks, e.g., as discussed at stage 2 of FIG. 9.

In one implementation, the measurement information for the UE may include the uplink positioning measurements, e.g., as discussed at stage 7 of FIG. 9.

In one implementation, the base station may further transmit downlink positioning reference signals to the UE, e.g., as discussed at stage 4 of FIG. 9. The base station may receive from the UE measurement information at least derived based on the downlink positioning reference signals, e.g., as discussed at stage 6 of FIG. 9. The measurement information for the UE may include the uplink and downlink positioning measurements, e.g., as discussed at stage 7 of FIG. 9. A means for transmitting downlink positioning reference signals to the UE may be, e.g., the wireless transceiver 1310 and one or more processors 1302 with dedicated hardware or implementing executable code or software instructions in memory 1304 and/or medium 1320 such as the DL PRS module 1326, as discussed in FIG. 13 below. A means for receiving from the UE measurement information at least derived based on the downlink positioning reference signals may be, e.g., the wireless transceiver 1310 and one or more processors 1302 with dedicated hardware or implementing executable code or software instructions in memory 1304 and/or medium 1320 such as the location information receive module 1328, as discussed in FIG. 13 below.

In one implementation, the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE may be associated with a span of a bandwidth, e.g., as discussed at stage 2 of FIG. 9. The accuracy requirement for the positioning measurements for the UE may be enhanced proportional to the span of the bandwidth, and the measurement information may further include an enhanced accuracy requirement, e.g., as discussed at stages 3 and 7 of FIG. 9.

In one implementation, the base station may further report to the location server that the positioning measurements for the UE were derived using the at least one of the interlaced PUCCH resource blocks, interlaced PUSCH resource blocks, interlaced SRS, interlaced UL PRS, or the combination thereof, e.g., as discussed at stage 7 of FIG. 9.

In one implementation, the at least one of the interlaced PUCCH resource blocks, interlaced PUSCH resource blocks, interlaced SRS, interlaced UL PRS, or the combination thereof are on an interlace designated for the base station, e.g., as discussed at stage 2 of FIG. 9.

In one implementation, the measurement information for the UE may include an indication of which channel was used to derive the positioning measurements, e.g., as discussed at stage 7 of FIG. 9.

In one implementation, the uplink transmission from the UE is received on an unlicensed frequency band, e.g., as discussed at stage 2 of FIG. 9.

Figure 11:
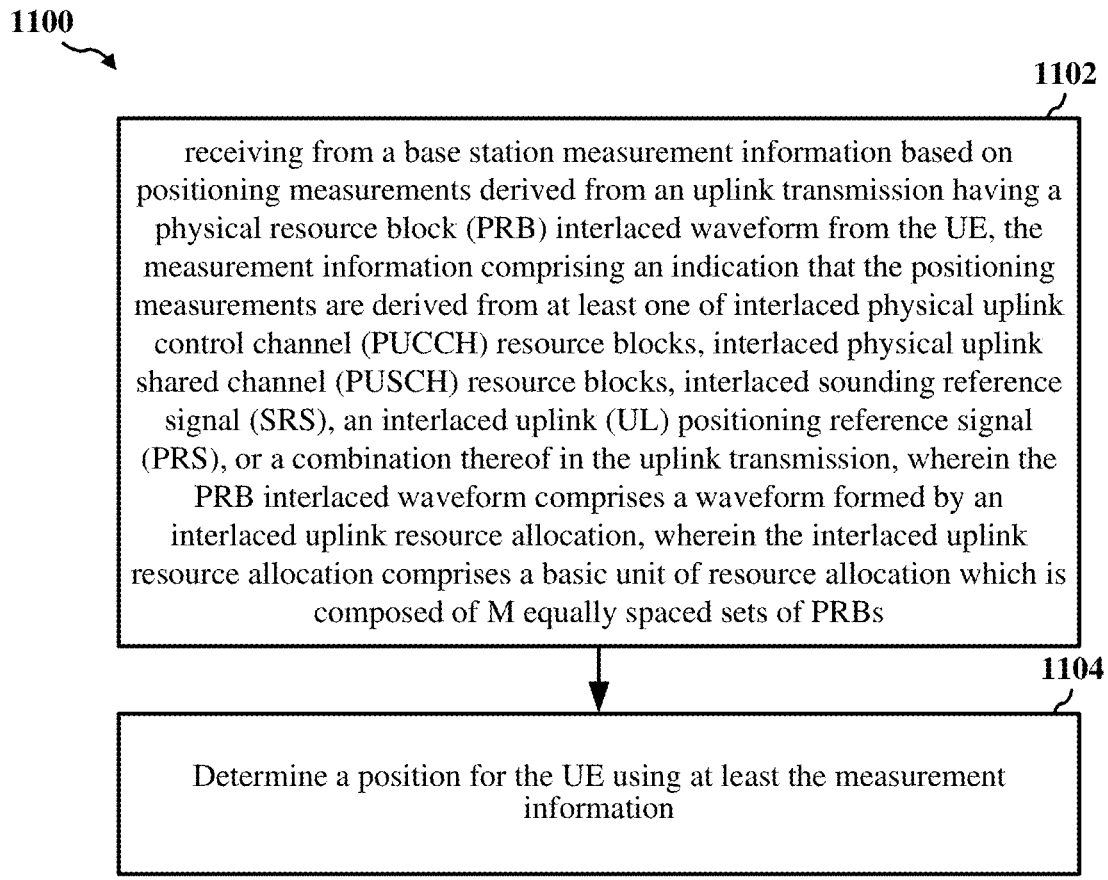
FIG. 11 shows a flowchart for an exemplary method for position determination of a UE performed by a location server in a wireless network.

FIG. 11 shows a flowchart for an exemplary method 1100 for position determination of a UE, such as UE 104, performed by a location server in a wireless network, such as location server 172, 230*a*, 230*b*, or LMF 270.

At block 1102, the location server may receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs, e.g., as discussed at stages 2, 3, and 7 of FIG. 9. A means for receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs which may be, e.g., the communications interface 1416 and one or more processors 1402 with dedicated hardware or implementing executable code or software instructions in memory 1404 and/or medium 1420 such as the receive report module 1422, as discussed in FIG. 14 below.

At block 1104, a position for the UE may be determined using at least the measurement information, e.g., as discussed at stage 8 of FIG. 9. A means for determining a position for the UE using at least the measurement information may be, e.g., the one or more processors 1402 with dedicated hardware or implementing executable code or software instructions in memory 1404 and/or medium 1420 such as the position determination module 1424, as discussed in FIG. 14 below.

In one implementation, each set of consecutive physical resource blocks may contain an equal number of physical resource blocks, e.g., as discussed at stage 2 of FIG. 9. In one implementation, each set of physical resource blocks may contain one physical resource block, e.g., as discussed at stage 2 of FIG. 9. In one implementation, at least two sets of consecutive physical resource blocks may contain an unequal number of physical resource blocks, e.g., as discussed at stage 2 of FIG. 9.

In one implementation, the measurement information for the UE may include the uplink positioning measurements, e.g., as discussed at stage 7 of FIG. 9.

In one implementation, the measurement information for the UE may include uplink and downlink positioning measurements, e.g., as discussed at stage 7 of FIG. 9.

In one implementation, the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE may be associated with a span of a bandwidth, e.g., as discussed at stage 2 of FIG. 9. The accuracy requirement for the positioning measurements for the UE may be enhanced proportional to the span of the bandwidth, and the measurement information may further include an enhanced accuracy requirement, e.g., as discussed at stages 3 and 7 of FIG. 9.

In one implementation, the measurement information for the UE may include an indication of which channel was used to derive the positioning measurements, e.g., as discussed at stage 7 of FIG. 9.

In one implementation, the uplink transmission from the UE is received on an unlicensed frequency band, e.g., as discussed at stage 2 of FIG. 9.

Figure 12:
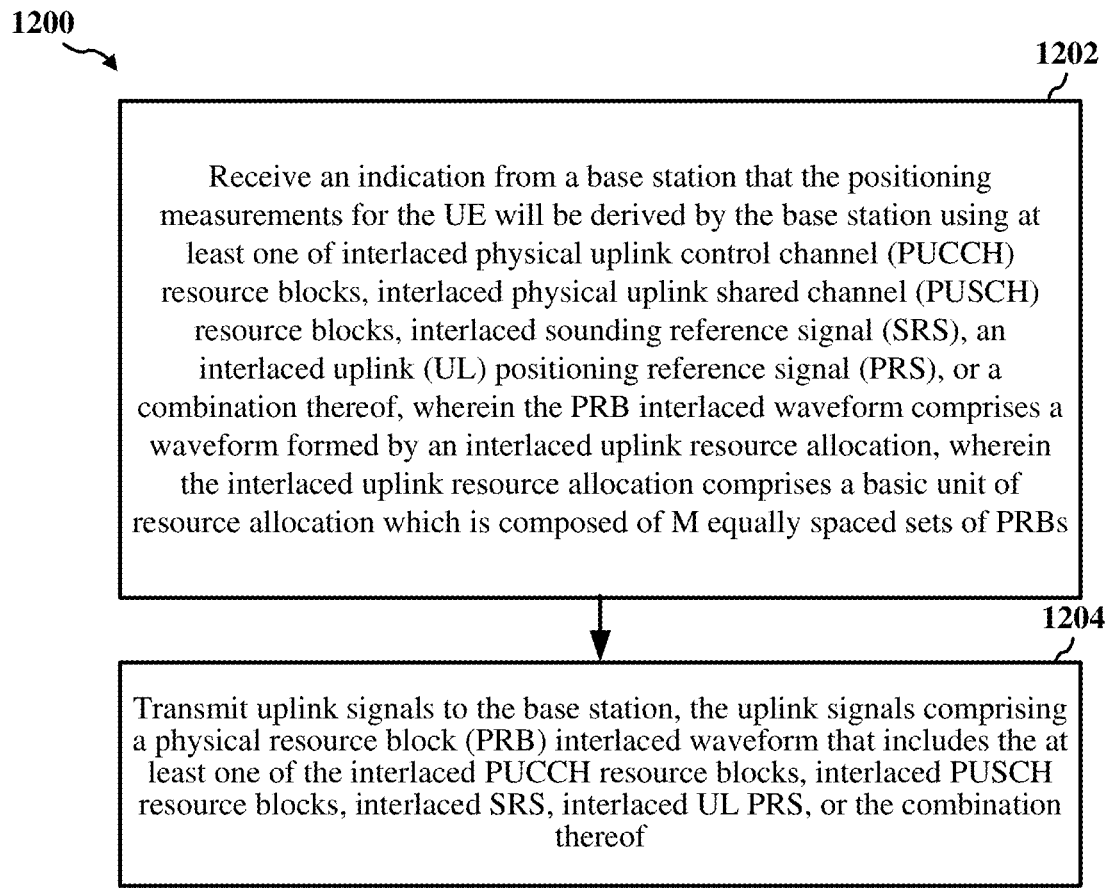
FIG. 12 shows a flowchart for an exemplary method for position determination of a UE performed by the UE in a wireless network.

FIG. 12 shows a flowchart for an exemplary method 1200 for position determination of a UE, performed by the UE in a wireless network, such as UE 104 in wireless network 100, shown in FIG. 1.

At block 1202, the UE receives an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs, e.g., as discussed at stage 1 of FIG. 9. A means for receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs may be, e.g., the wireless transceiver 1510 and one or more processors 1502 with dedicated hardware or implementing executable code or software instructions in memory 1504 and/or medium 1520 such as the UL interlace PRB positioning measurement module 1522, as discussed in FIG. 15 below.

At block 1204, uplink signals are transmitted to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof, e.g., as discussed at stage 1 of FIG. 9. A means for transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof may be, e.g., the wireless transceiver 1510 and one or more processors 1502 with dedicated hardware or implementing executable code or software instructions in memory 1504 and/or medium 1520 such as the UL interlace PRB module 1524, as discussed in FIG. 15 below.

In one implementation, each set of consecutive physical resource blocks may contain an equal number of physical resource blocks, e.g., as discussed at stage 2 of FIG. 9. In one implementation, each set of physical resource blocks may contain one physical resource block, e.g., as discussed at stage 2 of FIG. 9. In one implementation, at least two sets of consecutive physical resource blocks may contain an unequal number of physical resource blocks, e.g., as discussed at stage 2 of FIG. 9.

In one implementation, the UE may derive the positioning measurements from downlink positioning reference signals received from the base station, e.g., as discussed at stage 5 of FIG. 9. Measurement information based on the positioning measurements from the downlink positioning reference signals is transmitted to the base station or a location server, e.g., as discussed at stage 6 of FIG. 9. A means for deriving positioning measurements from downlink positioning reference signals received from the UE may be, e.g., the wireless transceiver 1510 and one or more processors 1502 with dedicated hardware or implementing executable code or software instructions in memory 1504 and/or medium 1520 such as the DL PRS module 1526 and the positioning measurement module 1528, as discussed in FIG. 15 below. A means for transmitting measurement information based on the positioning measurements from the downlink positioning reference signals to the base station or a location server may be, e.g., the wireless transceiver 1510 and one or more processors 1502 with dedicated hardware or implementing executable code or software instructions in memory 1504 and/or medium 1520 such as the location information transmit module 1530, as discussed in FIG. 15 below.

In one implementation, the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE may be associated with a span of a bandwidth, e.g., as discussed at stage 2 of FIG. 9. The accuracy requirement for the positioning measurements for the UE may be enhanced proportional to the span of the bandwidth, e.g., as discussed at stage 3 of FIG. 9.

In one implementation, the at least one of the interlaced PUCCH resource blocks, interlaced PUSCH resource blocks, interlaced SRS, interlaced UL PRS, or the combination thereof are on an interlace designated for the base station, e.g., as discussed at stage 2 of FIG. 9.

In one implementation, the uplink transmission from the UE is received on an unlicensed frequency band, e.g., as discussed at stage 2 of FIG. 9.

Figure 13:
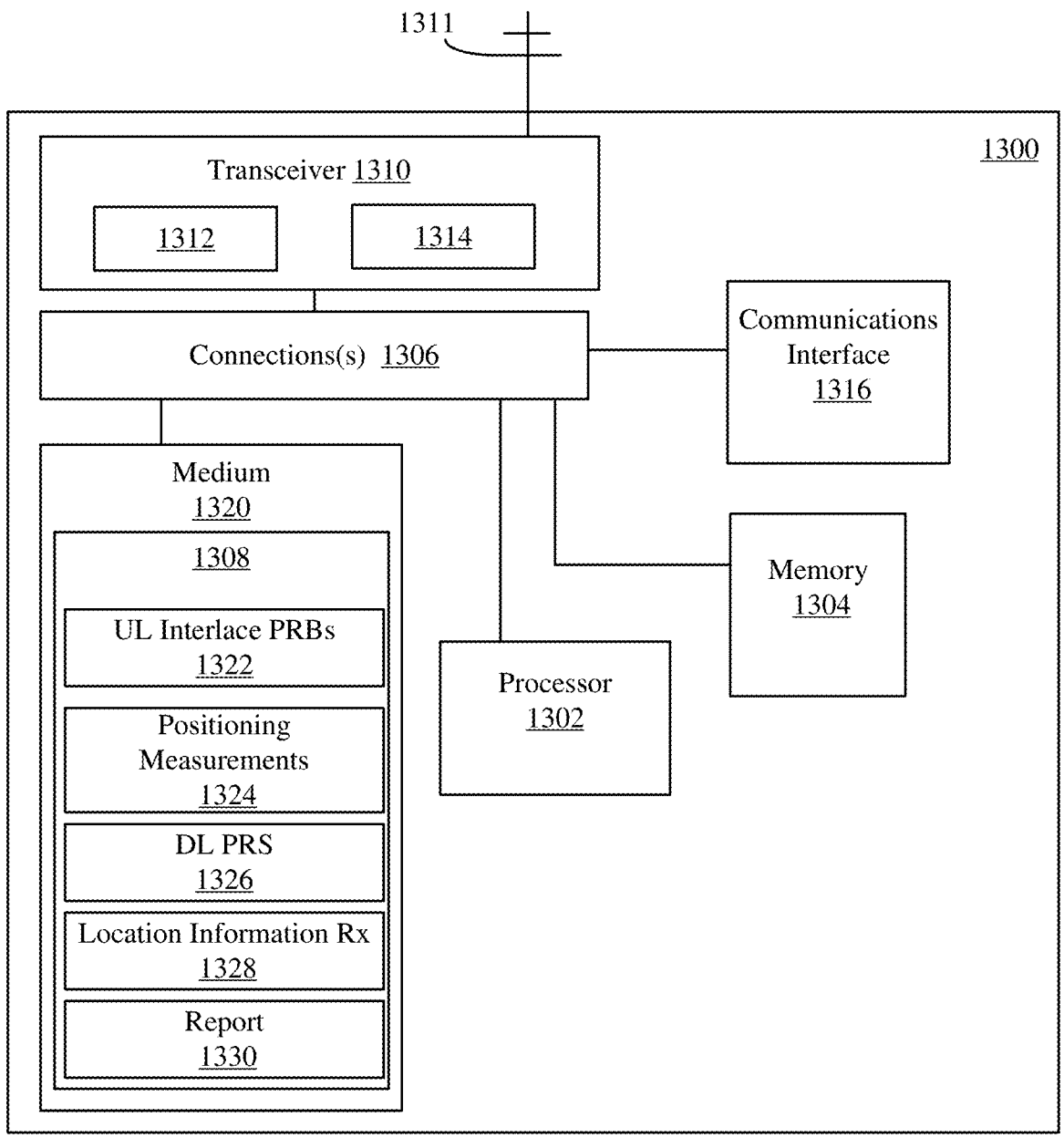
FIG. 13 is a schematic block diagram illustrating certain exemplary features of a base station enabled to support positioning of a UE using UL interlaced PRBs.

FIG. 13 shows a schematic block diagram illustrating certain exemplary features of a base station 1300 in a wireless network enabled to support positioning of a UE using UL interlaced PRBs, according to the disclosure herein. The base station 1300, for example, may be an eNB or gNB. The base station 1300 may, for example, include one or more processors 1302, memory 1304, and an external interface, which may include a wireless transceiver 1310 (e.g., wireless network interface), and a communications interface 1316 (e.g., wireline or wireless network interface to other network entities and/or the core network), which may be operatively coupled with one or more connections 1306 (e.g., buses, lines, fibers, links, etc.) to non-transitory computer readable medium 1320 and memory 1304. In some implementations, the base station 1300 may further include additional items, which are not shown. In certain example implementations, all or part of base station 1300 may take the form of a chipset, and/or the like. Wireless transceiver 1310, if present, may, for example, include a transmitter 1312 enabled to transmit one or more signals over one or more types of wireless communication networks and a receiver 1314 to receive one or more signals transmitted over the one or more types of wireless communication networks. The communications interface 1316 may be a wired or wireless interface capable of connecting to other base stations, e.g., in the RAN or network entities, such as a location server 172 shown in FIG. 1.

In some embodiments, base station 1300 may include antenna 1311, which may be internal or external. Antenna 1311 may be used to transmit and/or receive signals processed by wireless transceiver 1310. In some embodiments, antenna 1311 may be coupled to wireless transceiver 1310. In some embodiments, measurements of signals received (transmitted) by base station 1300 may be performed at the point of connection of the antenna 1311 and wireless transceiver 1310. For example, the measurement point of reference for received (transmitted) RF signal measurements may be an input (output) terminal of the receiver 1314 (transmitter 1312) and an output (input) terminal of the antenna 1311. In a base station 1300 with multiple antennas 1311 or antenna arrays, the antenna connector may be viewed as a virtual point representing the aggregate output (input) of multiple antennas. In some embodiments, base station 1300 may measure received signals, (e.g., interlaced PRBs, including interlaced PUCCH, interlaced PUSCH, UL PRS or SRS) including signal strength and TOA measurements and the raw measurements may be processed by the one or more processors 1302.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of base station 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in base station 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors.

A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in base station 1300 is merely exemplary, and as such the functionality of the modules and/or data structures may be combined, separated, and/or be structured in different ways depending upon the implementation of the base station 1300.

The medium 1320 and/or memory 1304 may include an UL interlace PRB module 1322 that when implemented by the one or more processors 1302 configures the one or more processors 1302 to receive, via the wireless transceiver 1310, from a UE a wireless transmission including PRB interlaced waveform that includes at least one of interlaced PUCCH resource blocks, interlaced PUSCH resource blocks, interlaced SRS, interlaced UL PRS, or a combination thereof. The PRB interlaced waveform may be a waveform formed by an interlaced uplink resource allocation, wherein the interlaced uplink resource allocation comprises a basic unit of resource allocation which is composed of M equally spaced sets of PRBs. Each set of consecutive PRBs may contains an equal number of PRBs, e.g., one PRB. In another implementation, at least two sets of consecutive PRBs contains an unequal number of PRBs. The uplink transmission from the UE is received on an unlicensed frequency band.

The medium 1320 and/or memory 1304 may include a positioning measurements module 1324 that when implemented by the one or more processors 1302 configures the one or more processors 1302 to derive positioning measurements for the UE using the at least one of the interlaced PUCCH resource blocks, interlaced PUSCH resource blocks, interlaced SRS, interlaced UL PRS, or the combination thereof in the uplink transmission from the UE. The positioning measurements, for example, may be UL positioning measurements such as RTOA, AoA, or RSRP. In some implementations, the positioning measurements may be UL/DL positioning measurements, such as RTT or multi-RTT positioning measurements. The interlaced PRBs may span a bandwidth, and the positioning measurements may use an enhanced accuracy requirement that is based on the span, which may be, e.g., a product of a number of interlaces and a number of resource blocks per interlace.

The medium 1320 and/or memory 1304 may include a DL PRS module 1326 that when implemented by the one or more processors 1302 configures the one or more processors 1302 transmit DL PRS to the UE, via the wireless transmitter, e.g., where multi-RTT positioning measurements are to be performed.

The medium 1320 and/or memory 1304 may include a location information receive module 1328 that when implemented by the one or more processors 1302 configures the one or more processors 1302 to receive location information from the UE, e.g., via the wireless transceiver 1310, related to positioning measurements, e.g., TOA or Rx-Tx, of the DL PRS.

The medium 1320 and/or memory 1304 may include a report module 1330 that when implemented by the one or more processors 1302 configures the one or more processors 1302 to transmit location information report to a location server, e.g., via the communications interface 1316. The location information may include the UL positioning measurements or UL/DL positioning measurements. The location information may additionally include an indication of the enhanced accuracy requirements. The location information may additionally include an indication of the channel used to derive the positioning measurements.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program 1308. For example, the non-transitory computer readable medium including program code 1308 stored thereon may include program code 1308 to support positioning of a UE using UL interlaced PRBs, in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include a wireless transceiver 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable code 1308 stored thereon, which if executed by one or more processors 1302 may be operatively enabled to perform all or portions of the example operations as described herein. Computer readable medium 1320 may be a part of memory 1304.

In one implementation, a base station in a wireless network may be configured to support position determination of a user equipment (UE) and may include a means for receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs, which may be, e.g., the wireless transceiver 1310 and one or more processors 1302 with dedicated hardware or implementing executable code or software instructions in memory 1304 and/or medium 1320 such as the UL interlace PRBs module 1322. A means for deriving positioning measurements for the UE using the at least one of the interlaced PUCCH resource blocks, interlaced PUSCH resource blocks, interlaced SRS, interlaced UL PRS, or the combination thereof in the uplink transmission from the UE may be, e.g., the one or more processors 1302 with dedicated hardware or implementing executable code or software instructions in memory 1304 and/or medium 1320 such as the positioning measurements module 1324. A means for reporting to a location server measurement information for the UE based on the positioning measurements may be, e.g., the communications interface 1316 and one or more processors 1302 with dedicated hardware or implementing executable code or software instructions in memory 1304 and/or medium 1320 such as the report module 1330.

In one implementation, the base station may further include a means for transmitting downlink positioning reference signals to the UE, which may be, e.g., the wireless transceiver 1310 and one or more processors 1302 with dedicated hardware or implementing executable code or software instructions in memory 1304 and/or medium 1320 such as the DL PRS module 1326. A means for receiving from the UE measurement information at least derived based on the downlink positioning reference signals may be, e.g., the wireless transceiver 1310 and one or more processors 1302 with dedicated hardware or implementing executable code or software instructions in memory 1304 and/or medium 1320 such as the location information receive module 1328.

Figure 14:
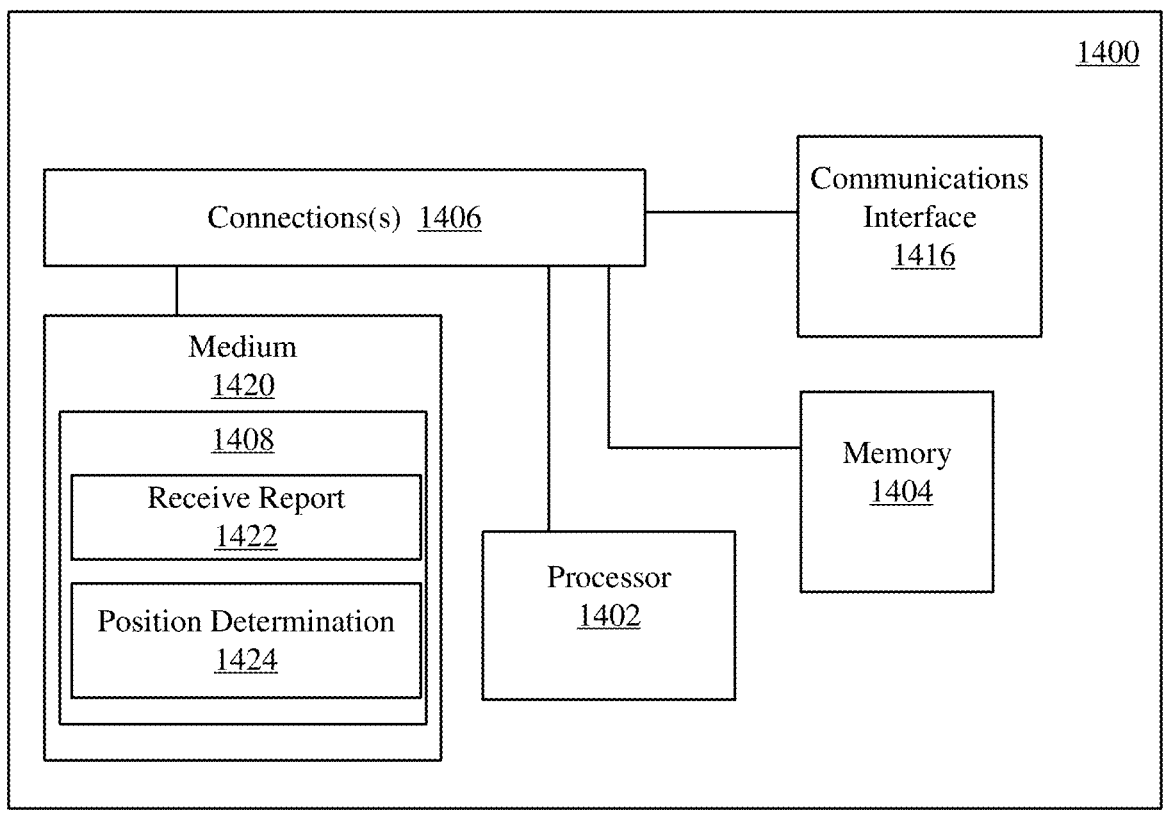
FIG. 14 is a schematic block diagram illustrating certain exemplary features of a location server enabled to support positioning of a UE using UL interlaced PRBs.

FIG. 14 shows a schematic block diagram illustrating certain exemplary features of a location server 1400 in a wireless network enabled to support positioning of a UE using UL interlaced PRBs, according to the disclosure herein. The location server 1400, for example, may be location server 172, 230*a*, 230*b*, or LMF 270 in FIGS. 1, 2A and 2B. The location server 1400 may, for example, include one or more processors 1402, memory 1404, and an external interface, which may communications interface 1416 (e.g., wireline or wireless network interface to other network entities and/or the core network), which may be operatively coupled with one or more connections 1406 (e.g., buses, lines, fibers, links, etc.) to non-transitory computer readable medium 1420 and memory 1404. In some implementations, the location server 1400 may further include additional items. In certain example implementations, all or part of location server 1400 may take the form of a chipset, and/or the like. The communications interface 1416 may be a wired or wireless interface capable of connecting to base stations, e.g., in the RAN or other network entities in the core network 170, shown in FIG. 1.

The one or more processors 1402 may be implemented using a combination of hardware, firmware, and software. For example, the one or more processors 1402 may be configured to perform the functions discussed herein by implementing one or more instructions or program code 1408 on a non-transitory computer readable medium, such as medium 1420 and/or memory 1404. In some embodiments, the one or more processors 1402 may represent one or more circuits configurable to perform at least a portion of a data signal computing procedure or process related to the operation of location server 1400.

The medium 1420 and/or memory 1404 may store instructions or program code 1408 that contain executable code or software instructions that when executed by the one or more processors 1402 cause the one or more processors 1402 to operate as a special purpose computer programmed to perform the techniques disclosed herein. As illustrated in location server 1400, the medium 1420 and/or memory 1404 may include one or more components or modules that may be implemented by the one or more processors 1402 to perform the methodologies described herein. While the components or modules are illustrated as software in medium 1420 that is executable by the one or more processors 1402, it should be understood that the components or modules may be stored in memory 1404 or may be dedicated hardware either in the one or more processors 1402 or off the processors.

A number of software modules and data tables may reside in the medium 1420 and/or memory 1404 and be utilized by the one or more processors 1402 in order to manage both communications and the functionality described herein. It should be appreciated that the organization of the contents of the medium 1420 and/or memory 1404 as shown in location server 1400 is merely exemplary, and as such the functionality of the modules and/or data structures may be combined, separated, and/or be structured in different ways depending upon the implementation of the location server 1400.

The medium 1420 and/or memory 1404 may include a receive report module 1422 that when implemented by the one or more processors 1402 configures the one or more processors 1402 to receive measurement information from a base station and/or UE, via the communications interface 1416. The measurement information may be based on positioning measurements derived from an uplink transmission having a PRB interlaced waveform from the UE, and may include an indication that the positioning measurements are derived from at least one of interlaced PUCCH resource blocks, interlaced PUSCH resource blocks, interlaced SRS, interlaced UL PRS, or a combination thereof in the uplink transmission. The PRB interlaced waveform may be a waveform formed by an interlaced uplink resource allocation, wherein the interlaced uplink resource allocation comprises a basic unit of resource allocation which is composed of M equally spaced sets of PRBs. Each set of consecutive PRBs may contains an equal number of PRBs, e.g., one PRB. In another implementation, at least two sets of consecutive PRBs contains an unequal number of PRBs. The location information may include the UL positioning measurements or UL/DL positioning measurements. The location information may additionally include an indication of the enhanced accuracy requirements. The location information may additionally include an indication of the channel used to derive the positioning measurements. The uplink transmission from the UE is received on an unlicensed frequency band.

The medium 1420 and/or memory 1404 may include a position determination module 1424 that when implemented by the one or more processors 1402 configures the one or more processors 1402 to determine a position for the UE using at least the measurement information, e.g. based on known positions of the base stations and trilateration.

The methodologies described herein may be implemented by various means depending upon the application. For example, these methodologies may be implemented in hardware, firmware, software, or any combination thereof. For a hardware implementation, the one or more processors 1402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1420 or memory 1404 that is connected to and executed by the one or more processors 1402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1408 on a non-transitory computer readable medium, such as medium 1420 and/or memory 1404. Examples include computer readable media encoded with a data structure and computer readable media encoded with a computer program 1408. For example, the non-transitory computer readable medium including program code 1408 stored thereon may include program code 1408 to support positioning of a UE using UL interlaced PRBs, in a manner consistent with disclosed embodiments. Non-transitory computer readable medium 1420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1408 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1420, instructions and/or data may be provided as signals on transmission media included in a communication apparatus. For example, a communication apparatus may include a communications interface 1416 having signals indicative of instructions and data. The instructions and data are configured to cause one or more processors to implement the functions outlined in the claims. That is, the communication apparatus includes transmission media with signals indicative of information to perform disclosed functions.

Memory 1404 may represent any data storage mechanism. Memory 1404 may include, for example, a primary memory and/or a secondary memory. Primary memory may include, for example, a random access memory, read only memory, etc. While illustrated in this example as being separate from one or more processors 1402, it should be understood that all or part of a primary memory may be provided within or otherwise co-located/coupled with the one or more processors 1402. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1420. As such, in certain example implementations, the methods and/or apparatuses presented herein may take the form in whole or part of a computer readable medium 1420 that may include computer implementable code 1408 stored thereon, which if executed by one or more processors 1402 may be operatively enabled to perform all or portions of the example operations as described herein. Computer readable medium 1420 may be a part of memory 1404.

In one implementation, a location server in a wireless network may be configured to support position determination of a user equipment (UE) and may include a means for receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs which may be, e.g., the communications interface 1416 and one or more processors 1402 with dedicated hardware or implementing executable code or software instructions in memory 1404 and/or medium 1420 such as the receive report module 1422. A means for determining a position for the UE using at least the measurement information may be, e.g., the one or more processors 1402 with dedicated hardware or implementing executable code or software instructions in memory 1404 and/or medium 1420 such as the position determination module 1424.

Figure 15:
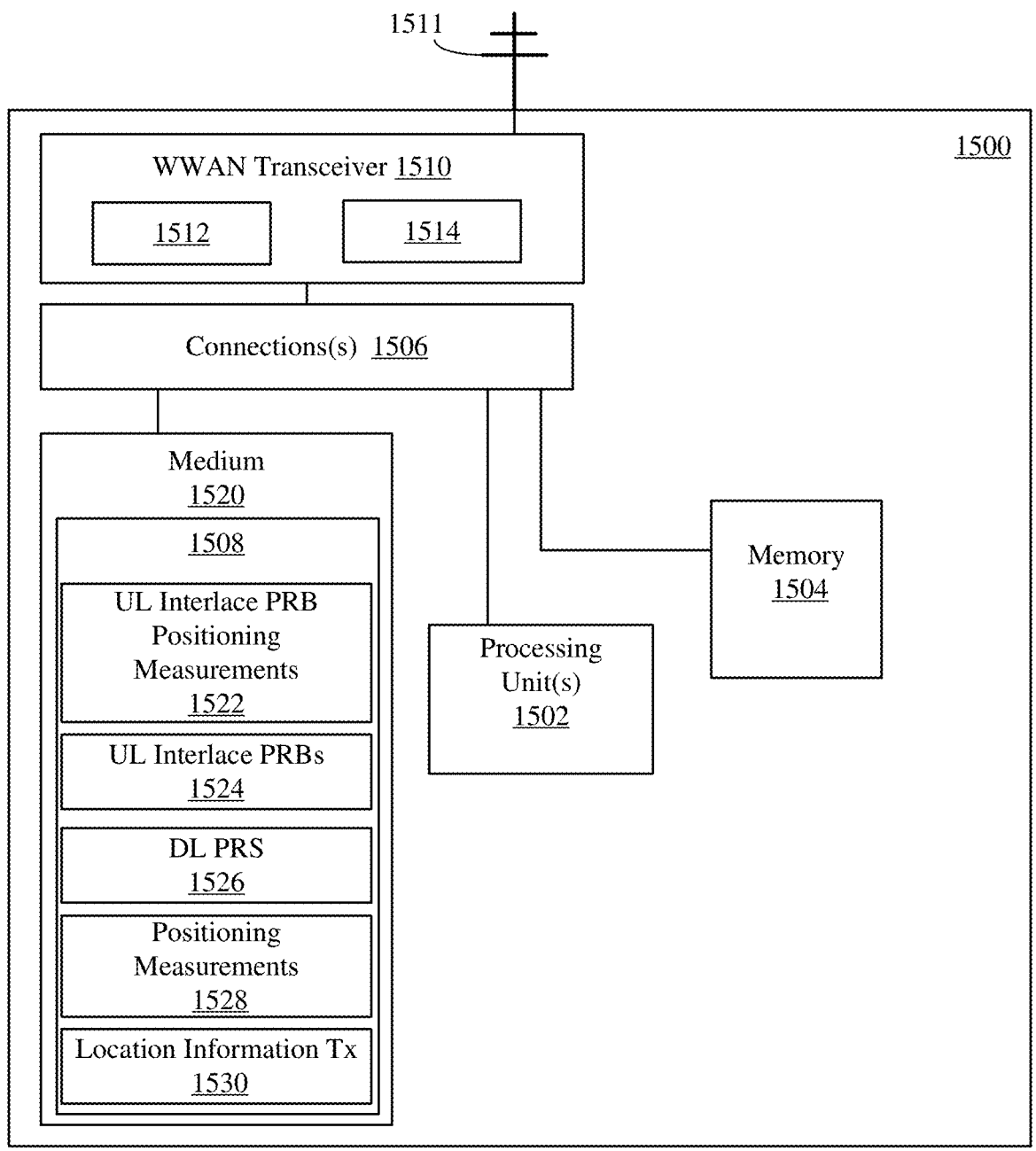
FIG. 15 is a schematic block diagram illustrating certain exemplary features of a UE enabled to support positioning of a UE using UL interlaced PRBs.

FIG. 15 shows a schematic block diagram illustrating certain exemplary features of a UE 1500, e.g., which may be UE 104 shown in FIG. 1, enabled to support positioning of a UE using UL interlaced PRBs, according to the disclosure herein. UE 1500 may, for example, include one or more processors 1502, memory 1504, an external interface such as a wireless transceiver 1510 (e.g., wireless network interface), which may be operatively coupled with one or more connections 1506 (e.g., buses, lines, fibers, links, etc.) to non-transitory computer readable medium 1520 and memory 1504. The UE 1500 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1500 may take the form of a chipset, and/or the like. Wireless transceiver 1510 may, for example, include a transmitter 1512 enabled to transmit one or more signals over one or more types of wireless communication networks and a receiver 1514 to receive one or more signals transmitted over the one or more types of wireless communication networks.

In some embodiments, UE 1500 may include antenna 1511, which may be internal or external. UE antenna 1511 may be used to transmit and/or receive signals processed by wireless transceiver 1510. In some embodiments, UE antenna 1511 may be coupled to wireless transceiver 1510. In some embodiments, measurements of signals received (transmitted) by UE 1500 may be performed at the point of connection of the UE antenna 1511 and wireless transceiver 1510. For example, the measurement point of reference for received (transmitted) RF signal measurements may be an input (output) terminal of the receiver 1514 (transmitter 1512) and an output (input) terminal of the UE antenna 1511. In a UE 1500 with multiple UE antennas 1511 or antenna arrays, the antenna connector may be viewed as a virtual point representing the aggregate output (input) of multiple UE antennas. UE 1200 may receive signals, e.g., DL PRS, and/or transmit interlaced PUCCH, PUSCH, SRS, and UL PRS for positioning. Measurements of signals, including one or more of timing measurements, such RSTD, UE Rx-Tx, TOA, etc., energy measurements, such as RSRP, quality metrics, velocity and/or trajectory measurements, reference TRP, multipath information, line of sight (LOS) or non-line of sight (NLOS) factors, signal to interference noise ratio (SINR), and time stamps may be processed by the one or more processors 1502.

The one or more processors 1502 may be implemented using a combination of hardware, firmware, and software. For example, the one or more processors 1502 may be configured to perform the functions discussed herein by implementing one or more instructions or program code 1508 on a non-transitory computer readable medium, such as medium 1520 and/or memory 1504. In some embodiments, the one or more processors 1502 may represent one or more circuits configurable to perform at least a portion of a data signal computing procedure or process related to the operation of UE 1500.

The medium 1520 and/or memory 1504 may store instructions or program code 1508 that contain executable code or software instructions that when executed by the one or more processors 1502 cause the one or more processors 1502 to operate as a special purpose computer programmed to perform the techniques disclosed herein. As illustrated in UE 1500, the medium 1520 and/or memory 1504 may include one or more components or modules that may be implemented by the one or more processors 1502 to perform the methodologies described herein. While the components or modules are illustrated as software in medium 1520 that is executable by the one or more processors 1502, it should be understood that the components or modules may be stored in memory 1504 or may be dedicated hardware either in the one or more processors 1502 or off the processors.

A number of software modules and data tables may reside in the medium 1520 and/or memory 1504 and be utilized by the one or more processors 1502 in order to manage both communications and the functionality described herein. It should be appreciated that the organization of the contents of the medium 1520 and/or memory 1504 as shown in UE 1500 is merely exemplary, and as such the functionality of the modules and/or data structures may be combined, separated, and/or be structured in different ways depending upon the implementation of the UE 1500.

The medium 1520 and/or memory 1504 may include a UL interlace PRB positioning measurement module 1522 that when implemented by the one or more processors 1502 configures the one or more processors 1502 to receive from a base station, via the wireless transceiver 1510, an indication that positioning measurements for the UE will be derived by the base station using at least one of interlaced PUCCH resource blocks, interlaced PUSCH resource blocks, interlaced SRS, an interlaced UL PRS, or a combination thereof. The PRB interlaced waveform may be a waveform formed by an interlaced uplink resource allocation, wherein the interlaced uplink resource allocation comprises a basic unit of resource allocation which is composed of M equally spaced sets of PRBs.

The medium 1520 and/or memory 1504 may include a UL interlace PRB module 1524 that when implemented by the one or more processors 1502 configures the one or more processors 1502 to transmit to one or more base stations, via the wireless transceiver 1510, the uplink signals comprising a PRB interlaced waveform that includes the at least one of the interlaced PUCCH resource blocks, interlaced PUSCH resource blocks, interlaced SRS, interlaced UL PRS, or the combination thereof. Each set of consecutive PRBs may contains an equal number of PRBs, e.g., one PRB. In another implementation, at least two sets of consecutive PRBs contains an unequal number of PRBs.

The medium 1520 and/or memory 1504 may include a DL PRS module 1526 that when implemented by the one or more processors 1502 configures the one or more processors 1502 to receive, via the wireless transceiver 1510, DL PRS transmitted by one or more base stations.

The medium 1520 and/or memory 1504 may include a position measurement module 1528 that when implemented by the one or more processors 1502 configures the one or more processors 1502 to perform positioning measurements using received DL PRS and/or UL PRS. For example, the one or more processors 1502 may be configured to perform DL and UL positioning measurements for one or more positioning methods based on the received DL PRS and the transmitted UL PRS. The positioning measurements may be for one or more positioning methods, such as TDOA, AoD, multi-RTT, hybrid positioning methods, etc. By way of example, the one or more processors 1502 may be configured for positioning measurements including one or more of, timing measurements such as RSTD, UE Rx-Tx, TOA, etc., energy measurements such as RSRP, quality metrics, velocity and/or trajectory measurements, reference TRP, multipath information, LOS/NLOS factors, SINR, and time stamps.

The medium 1520 and/or memory 1504 may include a location information transmit module 15302 that when implemented by the one or more processors 1502 configures the one or more processors 1502 to transmit to a base station or a location server, via the wireless transceiver, measurement information based on the positioning measurements from the DL PRS.

The methodologies described herein may be implemented by various means depending upon the application. For example, these methodologies may be implemented in hardware, firmware, software, or any combination thereof. For a hardware implementation, the one or more processors 1502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1520 or memory 1504 that is connected to and executed by the one or more processors 1502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1508 on a non-transitory computer readable medium, such as medium 1520 and/or memory 1504. Examples include computer readable media encoded with a data structure and computer readable media encoded with a computer program 1508. For example, the non-transitory computer readable medium including program code 1508 stored thereon may include program code 1508 to support positioning of the UE using UL interlaced PRBs, in a manner consistent with disclosed embodiments. Non-transitory computer readable medium 1520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1520, instructions and/or data may be provided as signals on transmission media included in a communication apparatus. For example, a communication apparatus may include a wireless transceiver 1510 having signals indicative of instructions and data. The instructions and data are configured to cause one or more processors to implement the functions outlined in the claims. That is, the communication apparatus includes transmission media with signals indicative of information to perform disclosed functions.

Memory 1504 may represent any data storage mechanism. Memory 1504 may include, for example, a primary memory and/or a secondary memory. Primary memory may include, for example, a random access memory, read only memory, etc. While illustrated in this example as being separate from one or more processors 1502, it should be understood that all or part of a primary memory may be provided within or otherwise co-located/coupled with the one or more processors 1502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1520. As such, in certain example implementations, the methods and/or apparatuses presented herein may take the form in whole or part of a computer readable medium 1520 that may include computer implementable code 1508 stored thereon, which if executed by one or more processors 1502 may be operatively enabled to perform all or portions of the example operations as described herein. Computer readable medium 1520 may be a part of memory 1504.

In one implementation, a user equipment (UE) in a wireless network may be configured to support position determination of the UE and may include a means for receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs, which may be, e.g., the wireless transceiver 1510 and one or more processors 1502 with dedicated hardware or implementing executable code or software instructions in memory 1504 and/or medium 1520 such as the UL interlace PRB positioning measurement module 1522. A means for transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof may be, e.g., the wireless transceiver 1510 and one or more processors 1502 with dedicated hardware or implementing executable code or software instructions in memory 1504 and/or medium 1520 such as the UL interlace PRB module 1524.

In one implementation, the UE may further include a means for deriving positioning measurements from downlink positioning reference signals received from the UE, which may be, e.g., the wireless transceiver 1510 and one or more processors 1502 with dedicated hardware or implementing executable code or software instructions in memory 1504 and/or medium 1520 such as the DL PRS module 1526 and the positioning measurement module 1528. A means for transmitting measurement information based on the positioning measurements from the downlink positioning reference signals to the base station or a location server may be, e.g., the wireless transceiver 1510 and one or more processors 1502 with dedicated hardware or implementing executable code or software instructions in memory 1504 and/or medium 1520 such as the location information transmit module 1530.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

1. A method for position determination of a user equipment (UE) performed by a base station in a wireless network, comprising: receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; deriving positioning measurements for the UE using the at least one of the interlaced PUCCH resource blocks, interlaced PUSCH resource blocks, interlaced SRS, interlaced UL PRS, or the combination thereof in the uplink transmission from the UE; and reporting to a location server measurement information for the UE based on the positioning measurements.

Clause 2. The method of clause 1, wherein each set of consecutive physical resource blocks contains an equal number of physical resource blocks.

Clause 3. The method of either of clauses 1 or 2, wherein each set of physical resource blocks contains one physical resource block.

Clause 4. The method of clause 1, wherein at least two sets of consecutive physical resource blocks contain an unequal number of physical resource blocks.

Clause 5. The method of any of clauses 1-4, wherein the measurement information for the UE comprises uplink positioning measurements.

Clause 6. The method of any of clauses 1-5, further comprising: transmitting downlink positioning reference signals to the UE; and receiving from the UE measurement information at least derived based on the downlink positioning reference signals; wherein the measurement information for the UE comprises uplink and downlink positioning measurements.

Clause 7. The method of any of clauses 1-6, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 8. The method of clause 7, wherein the accuracy requirement for the positioning measurements for the UE is enhanced proportional to the span of the bandwidth, wherein the measurement information comprises an enhanced accuracy requirement.

Clause 9. The method of any of clauses 1-8, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

Clause 10. The method of any of clauses 1-9, wherein the at least one of the interlaced PUCCH resource blocks, interlaced PUSCH resource blocks, interlaced SRS, interlaced UL PRS, or the combination thereof are on an interlace designated for the base station.

Clause 11. The method of any of clauses 1-10, wherein the measurement information for the UE comprises an indication of which channel was used to derive the positioning measurements.

Clause 12. The method of any of clauses 1-11, wherein the uplink transmission from the UE is received on an unlicensed frequency band.

Clause 13. A base station in a wireless network configured to support position determination of a user equipment (UE), comprising: an external interface configured to communicate in the wireless network; at least one memory; at least one processor coupled to the external interface and the at least one memory, wherein the at least one processor is configured to: receive an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; derive positioning measurements for the UE using the at least one of the interlaced PUCCH resource blocks, interlaced PUSCH resource blocks, interlaced SRS, interlaced UL PRS, or the combination thereof in the uplink transmission from the UE; and report to a location server measurement information for the UE based on the positioning measurements.

Clause 14. The base station of clause 13, wherein each set of consecutive physical resource blocks contains an equal number of physical resource blocks.

Clause 15. The base station of either of clauses 13 or 14, wherein each set of physical resource blocks contains one physical resource block.

Clause 16. The base station of clause 13, wherein at least two sets of consecutive physical resource blocks contain an unequal number of physical resource blocks.

Clause 17. The base station of any of clauses 13-16, wherein the measurement information for the UE comprises uplink positioning measurements.

Clause 18. The base station of any of clauses 13-17, wherein the at least one processor is further configured to: transmit downlink positioning reference signals to the UE; and receive from the UE measurement information at least derived based on the downlink positioning reference signals; wherein the measurement information for the UE comprises uplink and downlink positioning measurements.

Clause 19. The base station of any of clauses 13-18, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 20. The base station of clause 19, wherein the accuracy requirement for the positioning measurements for the UE is enhanced proportional to the span of the bandwidth, wherein the measurement information comprises an enhanced accuracy requirement.

Clause 21. The base station of any of clauses 13-20, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

Clause 22. The base station of any of clauses 13-21, wherein the at least one of the interlaced PUCCH resource blocks, interlaced PUSCH resource blocks, interlaced SRS, interlaced UL PRS, or the combination thereof are on an interlace designated for the base station.

Clause 23. The base station of any of clauses 13-22, wherein the measurement information for the UE comprises an indication of which channel was used to derive the positioning measurements.

Clause 24. The base station of any of clauses 13-23, wherein the uplink transmission from the UE is received on an unlicensed frequency band.

Clause 25. A base station in a wireless network configured to support position determination of a user equipment (UE), comprising: means for receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; means for deriving positioning measurements for the UE using the at least one of the interlaced PUCCH resource blocks, interlaced PUSCH resource blocks, interlaced SRS, interlaced UL PRS, or the combination thereof in the uplink transmission from the UE; and means for reporting to a location server measurement information for the UE based on the positioning measurements.

Clause 26. The base station of clause 25, wherein each set of consecutive physical resource blocks contains an equal number of physical resource blocks.

Clause 27. The base station of either of clauses 25 or 26, wherein each set of physical resource blocks contains one physical resource block.

Clause 28. The base station of clause 25, wherein at least two sets of consecutive physical resource blocks contain an unequal number of physical resource blocks.

Clause 29. The base station of any of clauses 25-28, wherein the measurement information for the UE comprises uplink positioning measurements.

Clause 30. The base station of any of clauses 25-29, further comprising: means for transmitting downlink positioning reference signals to the UE; and means for receiving from the UE measurement information at least derived based on the downlink positioning reference signals; wherein the measurement information for the UE comprises uplink and downlink positioning measurements.

Clause 31. The base station of any of clauses 25-30, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 32. The base station of clause 31, wherein the accuracy requirement for the positioning measurements for the UE is enhanced proportional to the span of the bandwidth, wherein the measurement information comprises an enhanced accuracy requirement.

Clause 33. The base station of any of clauses 25-32, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

Clause 34. The base station of any of clauses 25-33, wherein the at least one of the interlaced PUCCH resource blocks, interlaced PUSCH resource blocks, interlaced SRS, interlaced UL PRS, or the combination thereof are on an interlace designated for the base station.

Clause 35. The base station of any of clauses 25-34, wherein the measurement information for the UE comprises an indication of which channel was used to derive the positioning measurements.

Clause 36. The base station of any of clauses 25-35, wherein the uplink transmission from the UE is received on an unlicensed frequency band.

Clause 37. A non-transitory storage medium including program code stored thereon, the program code is operable to configure at least one processor in a base station in a wireless network configured to support position determination of a user equipment (UE), comprising: program code to receive an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; program code to derive positioning measurements for the UE using the at least one of the interlaced PUCCH resource blocks, interlaced PUSCH resource blocks, interlaced SRS, interlaced UL PRS, or the combination thereof in the uplink transmission from the UE; and program code to report to a location server measurement information for the UE based on the positioning measurements.

Clause 38. The non-transitory storage medium of clause 37, wherein each set of consecutive physical resource blocks contains an equal number of physical resource blocks.

Clause 39. The non-transitory storage medium of either of clauses 37 or 38, wherein each set of physical resource blocks contains one physical resource block.

Clause 40. The non-transitory storage medium of clause 37, wherein at least two sets of consecutive physical resource blocks contain an unequal number of physical resource blocks.

Clause 41. The non-transitory storage medium of any of clauses 37-40, wherein the measurement information for the UE comprises uplink positioning measurements.

Clause 42. The non-transitory storage medium of any of clauses 37-41, further comprising: program code to transmit downlink positioning reference signals to the UE; and program code to receive from the UE measurement information at least derived based on the downlink positioning reference signals; wherein the measurement information for the UE comprises uplink and downlink positioning measurements.

Clause 43. The non-transitory storage medium of any of clauses 37-42, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 44. The non-transitory storage medium of clause 43, wherein the accuracy requirement for the positioning measurements for the UE is enhanced proportional to the span of the bandwidth, wherein the measurement information comprises an enhanced accuracy requirement.

Clause 45. The non-transitory storage medium of any of clauses 37-43, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

Clause 46. The non-transitory storage medium of any of clauses 37-45, wherein the at least one of the interlaced PUCCH resource blocks, interlaced PUSCH resource blocks, interlaced SRS, interlaced UL PRS, or the combination thereof are on an interlace designated for the base station.

Clause 47. The non-transitory storage medium of any of clauses 37-46, wherein the measurement information for the UE comprises an indication of which channel was used to derive the positioning measurements.

Clause 48. The non-transitory storage medium of any of clauses 37-47, wherein the uplink transmission from the UE is received on an unlicensed frequency band.

Clause 49. A method for position determination of a user equipment (UE) performed by a location server in a wireless network, comprising: receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and determining a position for the UE using at least the measurement information.

Clause 50. The method of clause 49, wherein each set of consecutive physical resource blocks contains an equal number of physical resource blocks.

Clause 51. The method of either of clauses 49 or 50, wherein each set of physical resource blocks contains one physical resource block.

Clause 52. The method of clause 49, wherein at least two sets of consecutive physical resource blocks contain an unequal number of physical resource blocks.

Clause 53. The method of any of clauses 49-52, wherein the measurement information for the UE comprises uplink positioning measurements.

Clause 54. The method of any of clauses 49-53, wherein the measurement information for the UE comprises uplink and downlink positioning measurements.

Clause 55. The method of any of clauses 49-54, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 56. The method of clause 55, wherein the accuracy requirement for the positioning measurements for the UE is enhanced proportional to the span of the bandwidth, wherein the measurement information comprises an enhanced accuracy requirement.

Clause 57. The method of any of clauses 49-56, wherein the measurement information for the UE comprises an indication of which channel was used to derive the positioning measurements.

Clause 58. The method of any of clauses 49-57, wherein the uplink transmission from the UE is on an unlicensed frequency band.

Clause 59. A location server in a wireless network configured to support position determination of a user equipment (UE), comprising: an external interface configured to communicate in the wireless network; at least one memory; at least one processor coupled to the external interface and the at least one memory, wherein the at least one processor is configured to: receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH)

resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and determine a position for the UE using at least the measurement information.

Clause 60. The location server of clause 59, wherein each set of consecutive physical resource blocks contains an equal number of physical resource blocks.

Clause 61. The location server of either of clauses 59 or 60, wherein each set of physical resource blocks contains one physical resource block.

Clause 62. The location server of clause 59, wherein at least two sets of consecutive physical resource blocks contain an unequal number of physical resource blocks.

Clause 63. The location server of any of clauses 59-62, wherein the measurement information for the UE comprises uplink positioning measurements.

Clause 64. The location server of any of clauses 59-63, wherein the measurement information for the UE comprises uplink and downlink positioning measurements.

Clause 65. The location server of any of clauses 59-64, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 66. The location server of clause 65, wherein the accuracy requirement for the positioning measurements for the UE is enhanced proportional to the span of the bandwidth, wherein the measurement information comprises an enhanced accuracy requirement.

Clause 67. The location server of any of clauses 59-66, wherein the measurement information for the UE comprises an indication of which channel was used to derive the positioning measurements.

Clause 68. The location server of any of clauses 59-67, wherein the uplink transmission from the UE is on an unlicensed frequency band.

Clause 69. A location server in a wireless network configured to support position determination of a user equipment (UE), comprising: means for receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and means for determining a position for the UE using at least the measurement information.

Clause 70. The location server of clause 69, wherein each set of consecutive physical resource blocks contains an equal number of physical resource blocks.

Clause 71. The location server of either of clauses 69 or 70, wherein each set of physical resource blocks contains one physical resource block.

Clause 72. The location server of clause 69, wherein at least two sets of consecutive physical resource blocks contain an unequal number of physical resource blocks.

Clause 73. The location server of any of clauses 69-72, wherein the measurement information for the UE comprises uplink positioning measurements.

Clause 74. The location server of any of clauses 69-73, wherein the measurement information for the UE comprises uplink and downlink positioning measurements.

Clause 75. The location server of any of clauses 69-74, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 76. The location server of clause 75, wherein the accuracy requirement for the positioning measurements for the UE is enhanced proportional to the span of the bandwidth, wherein the measurement information comprises an enhanced accuracy requirement.

Clause 77. The location server of any of clauses 69-76, wherein the measurement information for the UE comprises an indication of which channel was used to derive the positioning measurements.

Clause 78. The location server of any of clauses 69-77, wherein the uplink transmission from the UE is on an unlicensed frequency band.

Clause 79. A non-transitory storage medium including program code stored thereon, the program code is operable to configure at least one processor in a location server in a wireless network configured to support position determination of a user equipment (UE), comprising: program code to receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and program code to determine a position for the UE using at least the measurement information.

Clause 80. The non-transitory storage medium of clause 79, wherein each set of consecutive physical resource blocks contains an equal number of physical resource blocks.

Clause 81. The non-transitory storage medium of either of clauses 79 or 80, wherein each set of physical resource blocks contains one physical resource block.

Clause 82. The non-transitory storage medium of clause 79, wherein at least two sets of consecutive physical resource blocks contain an unequal number of physical resource blocks.

Clause 83. The non-transitory storage medium of any of clauses 79-82, wherein the measurement information for the UE comprises uplink positioning measurements.

Clause 84. The non-transitory storage medium of any of clauses 79-83, wherein the measurement information for the UE comprises uplink and downlink positioning measurements.

Clause 85. The non-transitory storage medium of any of clauses 79-84, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

Clause 86. The non-transitory storage medium of clause 85, wherein the accuracy requirement for the positioning measurements for the UE is enhanced proportional to the span of the bandwidth, wherein the measurement information comprises an enhanced accuracy requirement.

Clause 87. The non-transitory storage medium of any of clauses 79-86, wherein the measurement information for the UE comprises an indication of which channel was used to derive the positioning measurements.

Clause 88. The non-transitory storage medium of any of clauses 79-87, wherein the uplink transmission from the UE is on an unlicensed frequency band.

Clause 89. A method for position determination of a user equipment (UE) performed by the UE in a wireless network, comprising: receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

Clause 90. The method of clause 89, wherein each set of consecutive physical resource blocks contains an equal number of physical resource blocks.

Clause 91. The method of either of clauses 89 or 90, wherein each set of physical resource blocks contains one physical resource block.

Clause 92. The method of clause 89, wherein at least two sets of consecutive physical resource blocks contain an unequal number of physical resource blocks.

Clause 93. The method of any of clauses 89-92, further comprising: deriving positioning measurements from downlink positioning reference signals received from the base station; and transmitting measurement information based on the positioning measurements from the downlink positioning reference signals to the base station or a location server.

Clause 94. The method of any of clauses 89-93, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

Clause 95. The method of clause 94, wherein the accuracy requirement for the positioning measurements for the UE is enhanced proportional to the span of the bandwidth.

Clause 96. The method of any of clauses 89-95, wherein the at least one of the interlaced PUCCH resource blocks, interlaced PUSCH resource blocks, interlaced SRS, interlaced UL PRS, or the combination thereof are on an interlace designated for the base station.

Clause 97. The method of any of clauses 89-96, wherein the uplink signals are transmitted on an unlicensed frequency band.

Clause 98. A user equipment (UE) in a wireless network configured to support position determination of the UE, comprising: a wireless transceiver configured to wirelessly communicate in the wireless network; at least one memory; at least one processor coupled to the wireless transceiver and the at least one memory, wherein the at least one processor is configured to: receive an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; transmit uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

Clause 99. The UE of clause 98, wherein each set of consecutive physical resource blocks contains an equal number of physical resource blocks.

Clause 100. The UE of either of clauses 98 or 99, wherein each set of physical resource blocks contains one physical resource block.

Clause 101. The UE of clause 98, wherein at least two sets of consecutive physical resource blocks contain an unequal number of physical resource blocks.

Clause 102. The UE of any of clauses 98-101, wherein the at least one processor is further configured to: derive positioning measurements from downlink positioning reference signals received from the base station; and transmit measurement information based on the positioning measurements from the downlink positioning reference signals to the base station or a location server.

Clause 103. The UE of any of clauses 98-102, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

Clause 104. The UE of clause 103, wherein the accuracy requirement for the positioning measurements for the UE is enhanced proportional to the span of the bandwidth.

Clause 105. The UE of any of clauses 98-104, wherein the at least one of the interlaced PUCCH resource blocks, interlaced PUSCH resource blocks, interlaced SRS, interlaced UL PRS, or the combination thereof are on an interlace designated for the base station.

Clause 106. The UE of any of clauses 98-105, wherein the uplink signals are transmitted on an unlicensed frequency band.

Clause 107. A user equipment (UE) in a wireless network configured to support position determination of the UE, comprising: means for receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; means for transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

Clause 108. The UE of clause 107, wherein each set of consecutive physical resource blocks contains an equal number of physical resource blocks.

Clause 109. The UE of either of clauses 107 or 108, wherein each set of physical resource blocks contains one physical resource block.

Clause 110. The UE of clause 107, wherein at least two sets of consecutive physical resource blocks contain an unequal number of physical resource blocks.

Clause 111. The UE of any of clauses 107-110, further comprising: means for deriving positioning measurements from downlink positioning reference signals received from the base station; and means for transmitting measurement information based on the positioning measurements from the downlink positioning reference signals to the base station or a location server.

Clause 112. The UE of any of clauses 107-111, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

Clause 113. The UE of clause 112, wherein the accuracy requirement for the positioning measurements for the UE is enhanced proportional to the span of the bandwidth.

Clause 114. The UE of any of clauses 107-113, wherein the at least one of the interlaced PUCCH resource blocks, interlaced PUSCH resource blocks, interlaced SRS, interlaced UL PRS, or the combination thereof are on an interlace designated for the base station.

Clause 115. The UE of any of clauses 107-114, wherein the uplink signals are transmitted on an unlicensed frequency band.

Clause 116. A non-transitory storage medium including program code stored thereon, the program code is operable to configure at least one processor in a user equipment (UE) in a wireless network configured to support position determination of the UE, comprising: program code to receive an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; program code to transmit uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

Clause 117. The non-transitory storage medium of clause 116, wherein each set of consecutive physical resource blocks contains an equal number of physical resource blocks.

Clause 118. The non-transitory storage medium of either of clauses 116 or 117, wherein each set of physical resource blocks contains one physical resource block.

Clause 119. The non-transitory storage medium of clause 116, wherein at least two sets of consecutive physical resource blocks contain an unequal number of physical resource blocks.

Clause 120. The non-transitory storage medium of any of clauses 116-119, further comprising: program code to derive positioning measurements from downlink positioning reference signals received from the base station; and program code to transmit measurement information based on the positioning measurements from the downlink positioning reference signals to the base station or a location server.

Clause 121. The non-transitory storage medium of any of clauses 116-120, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

Clause 122. The non-transitory storage medium of clause 121, wherein the accuracy requirement for the positioning measurements for the UE is enhanced proportional to the span of the bandwidth.

Clause 123. The non-transitory storage medium of any of clauses 116-122, wherein the at least one of the interlaced PUCCH resource blocks, interlaced PUSCH resource blocks, interlaced SRS, interlaced UL PRS, or the combination thereof are on an interlace designated for the base station.

Clause 124. The non-transitory storage medium of any of clauses 116-123, wherein the uplink signals are transmitted on an unlicensed frequency band.

Therefore, it is intended that claimed subject matter not be limited to the particular examples disclosed, but that such claimed subject matter may also include all aspects falling within the scope of appended claims, and equivalents thereof.

What is claimed is:

1. A method for position determination of a user equipment (UE) performed by a base station in a wireless network, comprising:
receiving an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs;

deriving positioning measurements for the UE using the at least one of the interlaced PUCCH resource blocks, interlaced PUSCH resource blocks, interlaced SRS, interlaced UL PRS, or the combination thereof in the uplink transmission from the UE; and reporting to a location server measurement information for the UE based on the positioning measurements.

2. The method of claim 1, wherein each set of consecutive physical resource blocks contains an equal number of physical resource blocks.

3. The method of claim 1, wherein each set of physical resource blocks contains one physical resource block.

4. The method of claim 1, wherein at least two sets of consecutive physical resource blocks contain an unequal number of physical resource blocks.

5. The method of claim 1, wherein the measurement information for the UE comprises uplink positioning measurements.

6. The method of claim 1, further comprising:
transmitting downlink positioning reference signals to the UE; and
receiving from the UE measurement information at least derived based on the downlink positioning reference signals;
wherein the measurement information for the UE comprises uplink and downlink positioning measurements.

7. The method of claim 1, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

8. The method of claim 7, wherein the accuracy requirement for the positioning measurements for the UE is enhanced proportional to the span of the bandwidth, wherein the measurement information comprises an enhanced accuracy requirement.

9. The method of claim 1, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

10. The method of claim 1, wherein the at least one of the interlaced PUCCH resource blocks, interlaced PUSCH resource blocks, interlaced SRS, interlaced UL PRS, or the combination thereof are on an interlace designated for the base station.

11. The method of claim 1, wherein the measurement information for the UE comprises an indication of which channel was used to derive the positioning measurements.

12. The method of claim 1, wherein the uplink transmission from the UE is received on an unlicensed frequency band.

13. A base station in a wireless network configured to support position determination of a user equipment (UE), comprising:
an external interface configured to communicate in the wireless network;
at least one memory;
at least one processor coupled to the external interface and the at least one memory, wherein the at least one processor is configured to:
receive an uplink transmission from the UE, the uplink transmission comprising a physical resource block (PRB) interlaced waveform that includes at least one of interlaced physical uplink control channel (PUCCH) resource blocks, interlaced physical uplink shared channel (PUSCH) resource blocks, interlaced sounding reference signal (SRS), interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs;
derive positioning measurements for the UE using the at least one of the interlaced PUCCH resource blocks, interlaced PUSCH resource blocks, interlaced SRS, interlaced UL PRS, or the combination thereof in the uplink transmission from the UE; and
report to a location server measurement information for the UE based on the positioning measurements.

14. The base station of claim 13, wherein each set of consecutive physical resource blocks contains an equal number of physical resource blocks.

15. The base station of claim 13, wherein each set of physical resource blocks contains one physical resource block.

16. The base station of claim 13, wherein at least two sets of consecutive physical resource blocks contain an unequal number of physical resource blocks.

17. The base station of claim 13, wherein the measurement information for the UE comprises uplink positioning measurements.

18. The base station of claim 13, wherein the at least one processor is further configured to:
transmit downlink positioning reference signals to the UE; and
receive from the UE measurement information at least derived based on the downlink positioning reference signals;
wherein the measurement information for the UE comprises uplink and downlink positioning measurements.

19. The base station of claim 13, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

20. The base station of claim 19, wherein the accuracy requirement for the positioning measurements for the UE is enhanced proportional to the span of the bandwidth, wherein the measurement information comprises an enhanced accuracy requirement.

21. The base station of claim 13, wherein the measurement information for the UE comprises an indication that the positioning measurements for the UE were derived using the at least one of the interlaced PUCCH resource blocks, interlaced PUSCH resource blocks, interlaced SRS, interlaced UL PRS, or the combination thereof.

22. The base station of claim 13, wherein the at least one of the interlaced PUCCH resource blocks, interlaced PUSCH resource blocks, interlaced SRS, interlaced UL PRS, or the combination thereof are on an interlace designated for the base station.

23. The base station of claim 13, wherein the measurement information for the UE comprises an indication of which channel was used to derive the positioning measurements.

24. The base station of claim 13, wherein the uplink transmission from the UE is received on an unlicensed frequency band.

25. A method for position determination of a user equipment (UE) performed by a location server in a wireless network, comprising:
 receiving from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and
 determining a position for the UE using at least the measurement information.

26. The method of claim 25, wherein each set of consecutive physical resource blocks contains an equal number of physical resource blocks.

27. The method of claim 25, wherein each set of physical resource blocks contains one physical resource block.

28. The method of claim 25, wherein at least two sets of consecutive physical resource blocks contain an unequal number of physical resource blocks.

29. The method of claim 25, wherein the measurement information for the UE comprises uplink positioning measurements.

30. The method of claim 25, wherein the measurement information for the UE comprises uplink and downlink positioning measurements.

31. The method of claim 25, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

32. The method of claim 31, wherein the accuracy requirement for the positioning measurements for the UE is enhanced proportional to the span of the bandwidth, wherein the measurement information comprises an enhanced accuracy requirement.

33. The method of claim 25, wherein the measurement information for the UE comprises an indication of which channel was used to derive the positioning measurements.

34. The method of claim 25, wherein the uplink transmission from the UE is on an unlicensed frequency band.

35. A location server in a wireless network configured to support position determination of a user equipment (UE), comprising:
 an external interface configured to communicate in the wireless network;
 at least one memory;
 at least one processor coupled to the external interface and the at least one memory, wherein the at least one processor is configured to:
  receive from a base station measurement information based on positioning measurements derived from an uplink transmission having a physical resource block (PRB) interlaced waveform from the UE, the measurement information comprising an indication that the positioning measurements are derived from at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof in the uplink transmission, wherein the PRB interlaced waveform comprises a waveform formed by an interlaced uplink resource allocation, wherein the interlaced uplink resource allocation comprises a basic unit of resource allocation which is composed of M equally spaced sets of PRBs; and
  determine a position for the UE using at least the measurement information.

36. The location server of claim 35, wherein each set of consecutive physical resource blocks contains an equal number of physical resource blocks.

37. The location server of claim 35, wherein each set of physical resource blocks contains one physical resource block.

38. The location server of claim 35, wherein at least two sets of consecutive physical resource blocks contain an unequal number of physical resource blocks.

39. The location server of claim 35, wherein the measurement information for the UE comprises uplink positioning measurements.

40. The location server of claim 35, wherein the measurement information for the UE comprises uplink and downlink positioning measurements.

41. The location server of claim 35, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with the span of the bandwidth.

42. The location server of claim 41, wherein the accuracy requirement for the positioning measurements for the UE is enhanced proportional to the span of the bandwidth, wherein the measurement information comprises an enhanced accuracy requirement.

43. The location server of claim 35, wherein the measurement information for the UE comprises an indication of which channel was used to derive the positioning measurements.

44. The location server of claim 35, wherein the uplink transmission from the UE is on an unlicensed frequency band.

45. A method for position determination of a user equipment (UE) performed by the UE in a wireless network, comprising:
 receiving an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; and transmitting uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

46. The method of claim 45, wherein each set of consecutive physical resource blocks contains an equal number of physical resource blocks.

47. The method of claim 45, wherein each set of physical resource blocks contains one physical resource block.

48. The method of claim 45, wherein at least two sets of consecutive physical resource blocks contain an unequal number of physical resource blocks.

49. The method of claim 45, further comprising:
deriving positioning measurements from downlink positioning reference signals received from the base station; and
transmitting measurement information based on the positioning measurements from the downlink positioning reference signals to the base station or a location server.

50. The method of claim 45, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

51. The method of claim 50, wherein the accuracy requirement for the positioning measurements for the UE is enhanced proportional to the span of the bandwidth.

52. The method of claim 45, wherein the at least one of the interlaced PUCCH resource blocks, interlaced PUSCH resource blocks, interlaced SRS, interlaced UL PRS, or the combination thereof are on an interlace designated for the base station.

53. The method of claim 45, wherein the uplink signals are transmitted on an unlicensed frequency band.

54. A user equipment (UE) in a wireless network configured to support position determination of the UE, comprising:
a wireless transceiver configured to wirelessly communicate in the wireless network;
at least one memory;
at least one processor coupled to the wireless transceiver and the at least one memory, wherein the at least one processor is configured to:

receive an indication from a base station that the positioning measurements for the UE will be derived by the base station using at least one of interlaced physical uplink control channel (PUCCH) resource blocks, interlaced physical uplink shared channel (PUSCH) resource blocks, interlaced sounding reference signal (SRS), an interlaced uplink (UL) positioning reference signal (PRS), or a combination thereof, wherein the PRB interlaced waveform comprises a waveform formed by an interlaced uplink resource allocation, wherein the interlaced uplink resource allocation comprises a basic unit of resource allocation which is composed of M equally spaced sets of PRBs; and transmit uplink signals to the base station, the uplink signals comprising a physical resource block (PRB) interlaced waveform that includes the at least one of the interlaced PUCCH resource blocks, interlaced PUSCH resource blocks, interlaced SRS, interlaced UL PRS, or the combination thereof.

55. The UE of claim 54, wherein each set of consecutive physical resource blocks contains an equal number of physical resource blocks.

56. The UE of claim 54, wherein each set of physical resource blocks contains one physical resource block.

57. The UE of claim 54, wherein at least two sets of consecutive physical resource blocks contain an unequal number of physical resource blocks.

58. The UE of claim 54, wherein the at least one processor is further configured to:
derive positioning measurements from downlink positioning reference signals received from the base station; and
transmit measurement information based on the positioning measurements from the downlink positioning reference signals to the base station or a location server.

59. The UE of claim 54, wherein the at least one of the interlaced PUCCH resource blocks, interlaced PUSCH resource blocks, interlaced SRS, interlaced UL PRS, or the combination thereof spans a bandwidth, and an accuracy requirement for the positioning measurements for the UE is associated with a span of the bandwidth.

60. The UE of claim 59, wherein the accuracy requirement for the positioning measurements for the UE is enhanced proportional to the span of the bandwidth.

61. The UE of claim 54, wherein the at least one of the interlaced PUCCH resource blocks, interlaced PUSCH resource blocks, interlaced SRS, interlaced UL PRS, or the combination thereof are on an interlace designated for the base station.

62. The UE of claim 54, wherein the uplink signals are transmitted on an unlicensed frequency band.

* * * * *